US009983460B2

(12) United States Patent
Hollinger

(10) Patent No.: US 9,983,460 B2
(45) Date of Patent: May 29, 2018

(54) THROWABLE LIGHT SOURCE FOR SYNCHRONIZATION WITH A CAMERA AND NETWORK FOR OPERATING THE SAME

(71) Applicant: Steven J. Hollinger, Boston, MA (US)

(72) Inventor: Steven J. Hollinger, Boston, MA (US)

( * ) Notice: Subject to any disclaimer, the term of this patent is extended or adjusted under 35 U.S.C. 154(b) by 306 days.

(21) Appl. No.: 15/099,819

(22) Filed: Apr. 15, 2016

(65) Prior Publication Data

US 2016/0231642 A1     Aug. 11, 2016

Related U.S. Application Data

(63) Continuation of application No. 14/100,434, filed on Dec. 9, 2013, now Pat. No. 9,341,357.

(51) Int. Cl.
| | |
|---|---|
| *F21L 4/00* | (2006.01) |
| *F21L 13/00* | (2006.01) |
| *G03B 15/03* | (2006.01) |
| *F21V 23/00* | (2015.01) |
| *F21L 4/08* | (2006.01) |
| *F21V 15/04* | (2006.01) |
| *A63B 43/06* | (2006.01) |
| *F21V 33/00* | (2006.01) |
| *F21V 15/01* | (2006.01) |
| *F42B 12/42* | (2006.01) |
| *A63B 43/04* | (2006.01) |
| *H05B 33/08* | (2006.01) |

(Continued)

(52) U.S. Cl.
CPC ............. *G03B 15/03* (2013.01); *A63B 43/04* (2013.01); *A63B 43/06* (2013.01); *F21L 4/08* (2013.01); *F21V 15/01* (2013.01); *F21V 15/04* (2013.01); *F21V 23/009* (2013.01); *F21V 33/008* (2013.01); *F42B 12/42* (2013.01); *H04N 5/2252* (2013.01); *H04N 5/2256* (2013.01); *H04N 5/23206* (2013.01); *H04N 5/77* (2013.01); *H05B 33/0806* (2013.01); *H05B 37/0272* (2013.01); *A63B 2071/0655* (2013.01); *A63B 2207/02* (2013.01); *A63B 2220/803* (2013.01); *A63B 2220/833* (2013.01); *F21Y 2101/02* (2013.01); *F21Y 2115/10* (2016.08)

(58) Field of Classification Search
CPC .. G03B 15/03; H04N 5/2256; H04N 5/23206; H04N 5/77; H04N 5/2252; H04N 2005/2255; H05B 37/0272; H05B 33/0806; F21V 33/008; F21V 15/01; F21V 23/009; F21V 15/04; F42B 12/42; F21L 4/08; F21Y 2115/10; F21Y 2101/02; A63B 2220/806; A63B 43/04; A63B 43/06; A63B 2071/0655; G06K 9/74
USPC ............. 362/3, 8, 11, 183; 348/157, 161, 69
See application file for complete search history.

(56) References Cited

U.S. PATENT DOCUMENTS

| | | | |
|---|---|---|---|
| 6,924,838 B1 * | 8/2005 | Nieves ................. | H04N 5/2251 348/143 |
| 2010/0066809 A1 * | 3/2010 | Cormack ............... | H02J 7/025 348/36 |
| 2011/0164137 A1 * | 7/2011 | Schwartz ......... | G08B 13/19621 348/159 |

* cited by examiner

*Primary Examiner* — Karabi Guharay
*Assistant Examiner* — Glenn Zimmerman

(57) ABSTRACT

A light source suitable for being thrown or projected into an airborne trajectory for the purpose of illuminating a subject or environment; and a throwable light source capable of receiving a signal over a wireless network in order to illuminate a subject in synchronization with a throwable camera on the network; and throwable light sources capable of receiving respective signals over a wireless network in (Continued)

order to illuminate a subject in synchronization with a throwable camera on the network.

20 Claims, 12 Drawing Sheets

(51) Int. Cl.
*H05B 37/02* (2006.01)
*H04N 5/225* (2006.01)
*H04N 5/232* (2006.01)
*H04N 5/77* (2006.01)
*A63B 71/06* (2006.01)
*F21Y 101/02* (2006.01)
*F21Y 115/10* (2016.01)

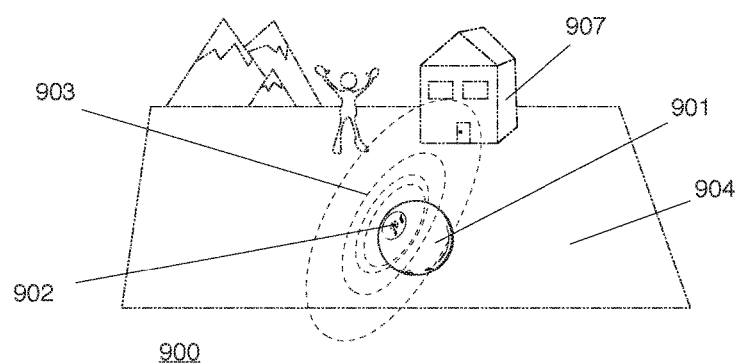
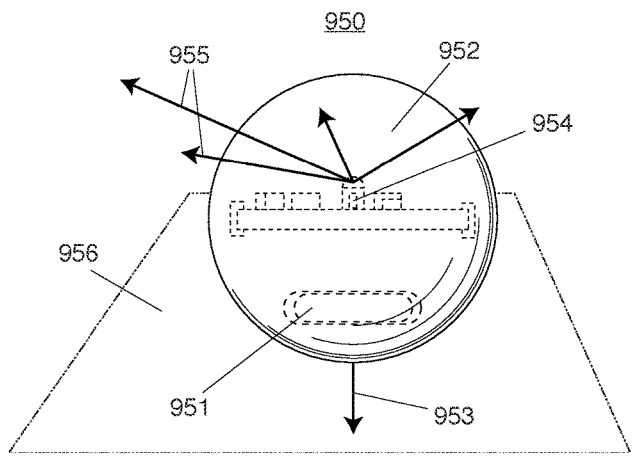
FIG. 9
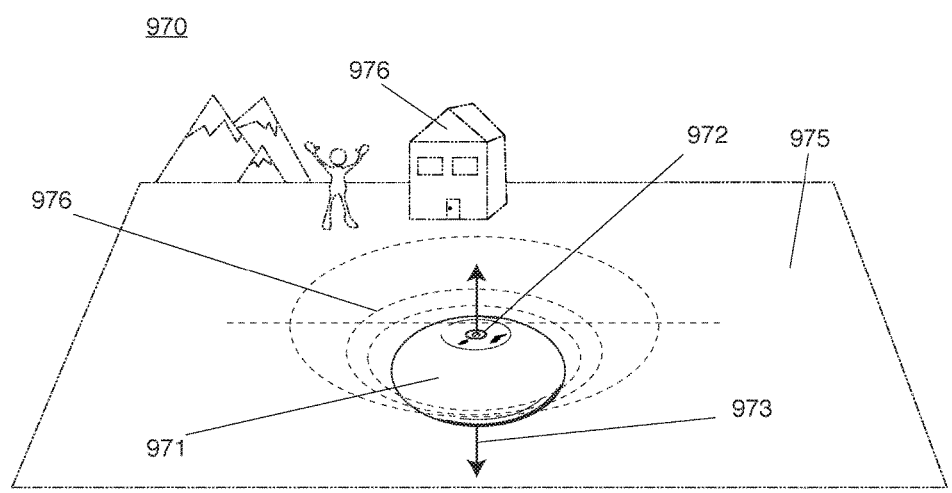

THROWABLE LIGHT SOURCE FOR SYNCHRONIZATION WITH A CAMERA AND NETWORK FOR OPERATING THE SAME

CROSS-REFERENCE TO RELATED APPLICATIONS

The present application is a continuation of U.S. patent application Ser. No. 14/100,434, Throwable light source and network for operating the same, filed Dec. 9, 2013. The entire contents of these applications are herein incorporated by reference.

STATEMENT REGARDING FEDERALLY SPONSORED RESEARCH DEVELOPMENT

Not applicable.

BACKGROUND OF THE INVENTION

1. Field of the Invention

The present invention has generally to do with light sources thrown or projected into an airborne trajectory, and a wireless network for operating light sources thrown or projected into an airborne trajectory along with accessory devices on the network such as synchronized cameras.

2. Description of Related Art

Handheld throwable lights and projectiles with embedded lights exist in prior art with suggested uses for tactical uses and general recreation.

U.S. Pat. No. 8,152,323 teaches of a throwable light source with a multi-part housing, comprised of two portions meeting at a releasable threaded interconnection. The releasable threaded interconnection presents an opportunity for undesirable tampering in a tactical environment. A seam of interconnection, characterized by overlapping regions of varying thickness with forces acting on opposing threads and surfaces, may present undesirable vulnerabilities upon a high G impact. A manually activated switch as described presents an opportunity for undesirable tampering in a tactical environment.

U.S. patent application Ser. No. 13/768,833 teaches of an orientable tactical light containing a light source that may be positioned in the housing to emit light in a predetermined direction relative to the center of gravity.

U.S. Pat. No. 3,610,916 teaches of a throwable light comprising a motion detecting switch and a timer.

U.S. Pat. No. 6,831,699 teaches of a self-righting monitoring device, describing a substantially ovoid shaped housing with a planar region. The planar region teaches of a stabilizing surface for image capture.

U.S. Pat. No. 8,030,851 describes a switchable induction light.

BRIEF SUMMARY OF THE INVENTION

The present disclosure relates to lights in impact-resistant housings that can be thrown or projected into a remote location for the purpose of illuminating an environment or subject.

A throwable light source can be improved by providing insulating means to protect embedded electronics. One method for insulating an electronic circuit from unwarranted tampering while also improving impact resistance is by manufacturing the housing as a single unified part. A method for insulating a throwable light source from tampering is by coupling its battery with an induction receiver embedded within the light's housing. The induction charged battery-powered throwable light source can be economically reused many times, if desired.

The throwable light source disclosed herein can be a battery-operated high-intensity light. One type of light source which has been found to be effective is a white light-emitting-diode (LED). An infrared LED light source is useful for illuminating dark environments without emitting light in the visible spectrum.

In one aspect, means are disclosed to prevent accidental activation of the throwable light source, to ensure that a throw from the user's hand or a pitch by mechanism such as a pitching machine is successful, with a throwable light source approaching or reaching a desired destination before activation is initiated.

The throwable lights of this invention can be used individually or in groups on a wireless network. Microcontrollers allow for the integration of sensors, switches and networks within the light's housing, making it possible for the intensity and action of lights to be controlled remotely. Lights may be controlled by self-contained logic capable of sensing external events. Lights may communicate these events to one another in order to produce a particular lighting effect.

The throwable light disclosed herein can be used with an associated throwable camera, activating one or more light sources synchronously with the camera to illuminate a scene for the capture of a photograph, or synchronized in a series of successive stroboscopic flashes to produce a motion picture or video. The throwable light may transmit commands and status information such as the state of activation wirelessly to a remote device such as a remote camera, and may receive commands such as timer synchronization commands from remote devices.

The throwable light described herein may be activated by a user without revealing the user's location or the path of the trajectory. The light can be adapted to be activated in a dark environment. The light can be adapted with haptic feedback means to signal its status to the user without revealing the user's location by presenting a visible indicator.

The throwable light of this invention may include weighting means within its housing to improve trajectory distance, and housing shape and surface adaptations to improve aerodynamic performance. An oblate housing shape can increase trajectory range by reducing drag and also can be adapted to emit light in a predetermined direction relative to the landing surface at the end of a thrown or projected trajectory.

While the lights are adapted to be thrown by hand, either individually or in sets or groups of two or more, the lights may be projected by any other suitable means from a device as simple as a slingshot to a long-range gas ($CO_2$)-powered launcher, such as used to fire paint-balls. Spring-powered launchers and gunpowder-powered launchers can also be used to fire individual lights, or groups of lights.

Various other objects, features and attendant advantages of the present disclosure will be more fully appreciated as the same becomes better understood from the following detailed description.

BRIEF DESCRIPTION OF THE SEVERAL VIEWS OF THE DRAWINGS

FIG. 9 shows views of environments in which throwable light sources of varying shapes and with varying respective centers of mass respond upon arriving at rest on landing surfaces.

DETAILED DESCRIPTION OF THE INVENTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The invention is a high-intensity light source that is thrown or projected into an airborne trajectory and is capable of illuminating environments of interest. Another aspect of this invention describes a high-intensity light source that is thrown or projected into an airborne trajectory and is capable of spotlighting a particular region or subject of interest while in flight or at its arrival location.

Figure 1:
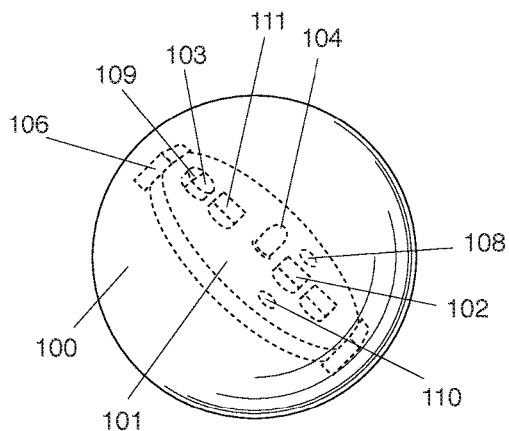
FIG. 1 shows the preferred embodiment of the throwable light source of this invention.
Figure 3:
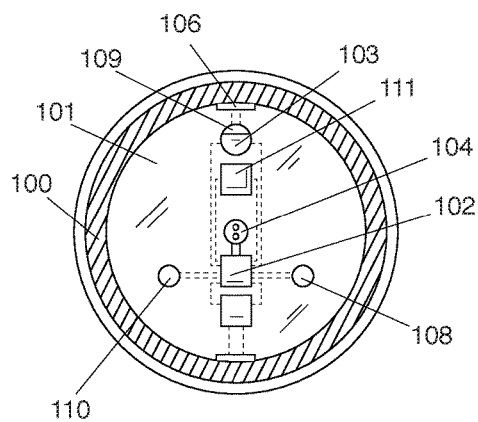
FIG. 3 is a sectional view along line 3-3 of FIG. 2.
Figure 2:
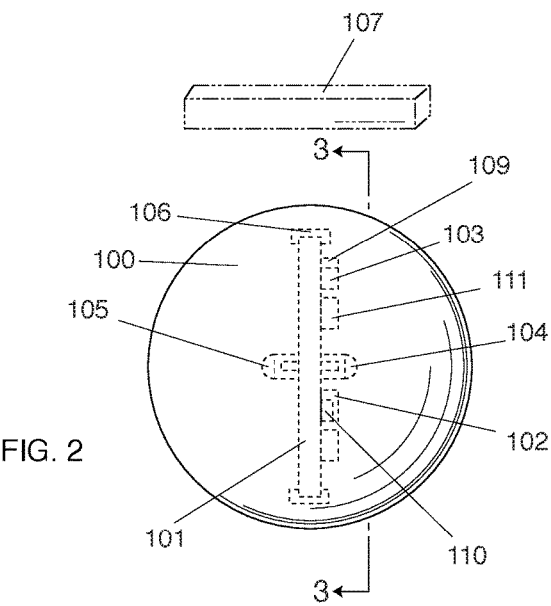
FIG. 2 is a left elevation view of the throwable light of FIG. 1 positioned adjacent to an associated induction power transmitter.

The preferred embodiment of the apparatus of this invention is illustrated at FIG. 1, also shown in a left side elevation at FIG. 2 and sectional view at FIG. 3.

As shown in the preferred embodiment of FIGS. 1, 2, and 3, housing 100 is a hermetically sealed hollow sphere, molded of a light-transmitting material, such as clear Lexan. The housing encases circuit board 101 and electronic components further described herein to generate high-intensity illumination. Electronic components embedded within the housing of the preferred embodiment include logic unit 102, power source 103 and two high-intensity LEDs 104 and 105. The hermetic seal of housing 100 ensures that electronic components are insulated from unwarranted tampering and from contamination by exposure to water, soil, gases and corrosive elements in the exterior environment.

While the preferred embodiment produces light comprises high-intensity LEDs with circuit board 101 having a secondary use as a heat sink, it is anticipated that the preferred embodiment as well as all embodiments described herein may employ one or more lasers, incandescent bulbs, fluorescent bulbs, halogen bulbs or any other light-producing technology capable of being powered within a thrown or projected apparatus and further capable of sustaining impact. It is further anticipated that a combination of light-producing technologies may be employed.

Electronics as described herein of the preferred embodiment allow for a hermetic seal, being fully operable and controllable by a human user without direct tactile contact to mechanical switches, electrical contacts or power-charging ports on the exterior surface of the apparatus. All necessary functions are contained beneath the surface of the light source including the user interface (external means for controlling operation of the apparatus), renewable power source, power source charging system and light-generating electronics such as LEDs.

As shown in FIG. 3, Housing 100 of the preferred embodiment is a single part forming a hollow shell. As an alternative to the single part housing forming a hollow shell, it is anticipated that the single part housing may be molded as a solid body using a material molded to completely encase embedded electronics.

In another possible, embodiment, it is anticipated that the single part housing may be a hollow shell as shown in the cross-section of housing 100 of FIG. 3, with the hollow shell containing an inner core of a second material, such as a clear elastomer, with this inner core itself molded to completely encase embedded electronics. A construction with an outer shell manufactured of a polymer having a Shore D durometer greater than 50 with an inner core of elastomer with a Shore A durometer less than 90 would cushion embedded electronics while allowing them to expand and contract, while the outer core dampened the housing from bouncing at the end of a trajectory.

Another embodiment of the housing comprises an elastomer overmold as the exterior layer of the shell that contains embedded electronic components. A light-transmitting elastomer overmold provides a non-slip surface and improves performance in sustaining high G impacts, while allowing embedded LEDs to illuminate the exterior environment.

While the preferred embodiment comprises two LEDs to generate light, at least one point source of light such as a single LED (or other light-producing technology such as laser) may be centrally located within a throwable light, so as to provide full spherical illumination of the exterior environment. Additional sources of light, multiple LEDs or a combination of light-generating technologies (LED, laser, et al.), are anticipated. The application of lenses; fiber optic cables; prisms; mirrors; mirror galvanometers; diffusers; conical, concave and convex mirrored surfaces; and other optics are anticipated to project, reflect, refract and diffuse light in any or all directions outwardly from the apparatus.

Embedded within housing 100 is rechargeable battery 103, the power source of the preferred embodiment. Induction receiver coil 106 is embedded beneath the surface of housing 100, enabling battery 103 to be recharged through induction power circuit 109 by placing induction receiver coil 106 in close proximity to remote (e.g. external, associated) induction power transmitter coil 107 shown in FIG. 2. The integration of induction receiver coil 106 and induction power circuit 109 within the housing, beneath its exterior surface, eliminates the need for direct user access to battery 103 for replacement and also eliminates the need for integration of a hardwired battery charging port on the surface of housing 100. Such a battery access door or charging port, if comprised by housing 100, would present possible points of exposure to embedded electronics by water and other corrosive elements, and would also present points of access to electronics for undesired tampering.

The preferred embodiment as described employs an induction system to charge an embedded battery for the purpose of powering the throwable light source of this invention. It is anticipated that the embedded battery may also provide power to sensors including cameras operably connected to the battery and co-existing within the housing of the throwable light source.

In the preferred embodiment, LEDs 104 and 105 of the preferred embodiment are activated and deactivated in a binary (on/off) state through digital operations of logic unit 102. In this respect, logic unit 102 functions as a binary switch controlling electrical flow between battery 103 and LEDs 104 and 105 based on a signal from a sensor further described herein. In another embodiment, it is anticipated that logic unit 102 may vary intensity or wavelength of a light source.

LEDs 104 and 105 of the preferred embodiment generate high-intensity visible white light. Another embodiment of the apparatus of this invention uses LEDs generating light in the infrared spectrum, to illuminate an environment for visibility by users of near or far infrared sensors, imagers and displays. Another embodiment of the apparatus of this invention comprises at least one infrared light source and at least one light source operating in the visible spectrum, providing the user with a switchable option to select either visible or infrared illumination.

An embodiment of the throwable light source of this invention comprises infrared and white light LEDs; and responds to a wireless signal from an external wireless remote control device; and, upon receipt of said signal, switches between visible and infrared illumination.

While the preferred embodiment employs two LEDs, one in each hemisphere of the housing, an embodiment employing multiple LEDs is anticipated in order to increase the lumen output.

A primary objective of the preferred embodiment of this invention is that the apparatus be tamper-proof upon and during activation. To prevent tampering, the logic unit of the preferred embodiment, responsible for switching on and off the LED light source, is entirely contained within the hermetically sealed housing, insulated from direct physical contact.

Another objective of the present invention is to illuminate a destination location without providing a visible indicator of the location of the apparatus of this invention while it is in the course of its trajectory. Such an objective ensures that the apparatus can be thrown without revealing the location of the user throwing the apparatus.

In the preferred embodiment of the throwable light source of this invention, to achieve the objective of protecting the user's location from being revealed, logic unit 102 enables power to flow to LEDs only after the apparatus has been thrown or projected into an airborne trajectory. To achieve this objective, inertial measurement unit (IMU) 108 is operably connected to logic 102, allowing logic unit 102 to determine if the apparatus has been pitched or projected into an airborne trajectory. While the inertial measurement unit of the preferred embodiment comprises a 3-axis accelerometer, 3-axis gyroscope and 3-axis magnetometer, it is anticipated that alternate types of sensors such as an image sensor can signal logic unit 102 that the apparatus has been thrown or projected.

With timer 110 operably connected to logic unit 102, logic unit 102 can delay the activation or deactivation of illumination at a predetermined time, or can monitor elapsed time as later described in this specification.

The preferred embodiment enters a low-power "Power-on ready" state if it is moved, as sensed by gross motion sensor 111. Gross motion sensor 111 may require a minimal trickle charge from battery 103 to monitor movement or it may be a zero-energy switch such as a mercury switch to monitor the movement of the apparatus.

Logic unit 102 may be processor or microcontroller operably connected, without limitation, to its own volatile or non-volatile memory, clock or timers. It is anticipated that, for example in the integration of accelerometer data, logic unit 102 will read and store data in its volatile memory. It is anticipated that, for example in the loading and saving of current settings, logic unit 102 will read and store data in non-volatile memory for recall between powered and unpowered states. Volatile memory may be comprised of RAM or any other volatile storage means known in the art. Non-volatile memory may be comprised of any combination of ROM, flash memory, F-RAM or magnetic media or other non-volatile storage means known in the art.

Figure 4:
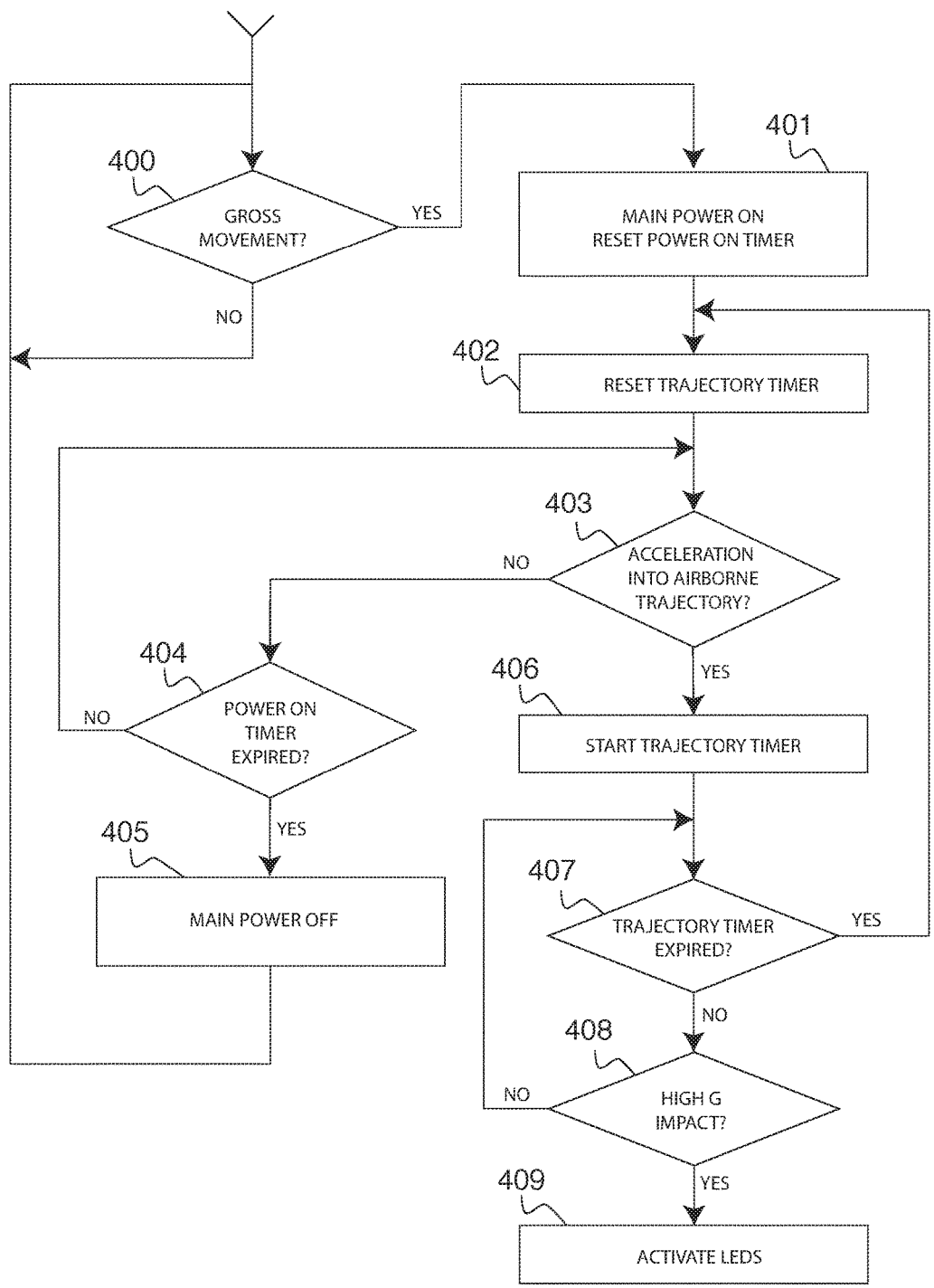
FIG. 4 shows a schematic diagram of a throwable light source according to the primary embodiment the present invention.

FIG. 4 illustrates an example flow diagram of a method for activating LEDs so as not to reveal the location of the user or arc of the airborne trajectory, in accordance with example embodiments. The method may be implemented by a single apparatus such as, for example, a logic unit, sensors, timer and LED embedded within the throwable light source of this invention. The order of the blocks shown in FIG. 4 is an example. The blocks may be arranged in other orders, each function described in each block may be performed one or more times, some blocks may be omitted, and/or additional blocks may be added. The method may begin at block 400.

In block 400, the method may determine if the apparatus is being moved. Such a determination may be made by reading a gross inertial measurement circuit; or a mechanically-activated impact switch; or other low-power movement-sensing circuit. It is anticipated that the sensing and switching logic of a gross movement circuit requires no power or low power, with block 400 representing a determination that is made without rapidly draining the power source of the apparatus.

In block 401, the method may include powering up and initializing a logic unit, sensors and a "power on" timer that enables the logic unit to determine how long it has been powered up. In block 402, the method may include the resetting of a "trajectory timer" to a value that indicates the apparatus is not in an airborne trajectory. In block 403, the method may include a determination of whether the apparatus has been thrown or projected into an airborne trajectory. Such a determination may be made, for example, using successive readings of a triple-axis accelerometer. In block 406, the method may include starting the trajectory timer, providing a means to approximate the amount of time that the apparatus is in its airborne trajectory. In block 407, the method may include reading a signal from the trajectory timer to determine if the time since the time that the apparatus entered an airborne trajectory exceeds a predetermined maximum. Such a calculation allows, for example, the apparatus to enter a power-off state if the user first attempts to pitch the apparatus, triggering a YES determination at block 403, but balks on the pitch before actually releasing the apparatus into an airborne trajectory.

In block 408, the method may include determining if the apparatus has impacted with a landing surface at the end of its trajectory. Such a determination may be made, for example, using an impact sensor that signals a rapid deceleration. In block 409, the method may include activation of high-intensity LEDs to illuminate the environment. Condition for arriving at block 409 requires the positive determination that the apparatus has accelerated into an airborne trajectory as detected in block 403; the determination that the apparatus has not been in a trajectory for an extended period of time as detected in block 407; and upon the impact of the apparatus at the end of its trajectory as detected in block 408.

In block 404, the method may include the determination that the device has been powered up for an extended period of time. Such a determination, if made at block 404, would indicate that the ball was moved (determined in block 400) but not thrown (determined in block 403) and therefore may be capable of being powered down. In block 405, the method may include powering down the apparatus. Power down at block 405 does not prevent the gross inertial measurement sensing circuitry or motion sensor of block 400 from continuing to function.

FIG. 4 illustrates one example logical approach for distinguishing a successful trajectory from a poorly thrown pitch, dropped apparatus, misfire from a pitching machine or other inadvertent operation. Such an approach protects the user from accidentally illuminating the light source before it arrives at its destination.

It is anticipated that a signal from a timer, such as timer 110 of FIGS. 1, 2 and 3, may result in the activation or deactivation of illumination by the throwable light source at a predetermined absolute time such as 12:00 PM GST. It is anticipated that a signal from a timer, such as timer 110 of FIGS. 1, 2 and 3, may result in the activation or deactivation of illumination by the throwable light source at a predetermined time relative to a particular event. For example, upon determining that a high-G impact has occurred, logic unit 102 of FIG. 1 may monitor a signal from timer 110 in order to delay activation of LEDs 104 and 105 by 20 seconds.

It should be noted that the component identified herein as a "logic unit," among other possible tasks, controls the activation state of the light source. In this respect, the logic unit may be one of a switch, processor, microcontroller, relay or any component capable of controlling flow of electricity between battery and light source. It is anticipated that the circuitry operating the logic unit may be isolated, optically, mechanically or otherwise, from the circuit powering the light source.

Unintended Balk, Drop and Misfire Detection

While the preferred embodiment, as taught by FIG. 4, is capable of confirming a successful pitch before activating onboard LEDs, further improvements to prevent accidental activation are anticipated.

An inertial measurement unit, acceleration sensor, image sensor or other means for detecting movement of the throwable light source can provide signal data to the logic unit for distinguishing between a short-range trajectory, long-range trajectory, accidental drop from the user's hand, misfire from a pitching machine or poorly thrown pitch. Such a determination can prevent accidental activation of the light source in situations, for example, where illumination of the throwable light could reveal the location of its user.

A number of approaches exist to determine if a trajectory is successful using sensors and timers to determine whether the throwable light has been pitched as anticipated; whether the trajectory is viable for the intended application; and whether the light has impacted as anticipated.

A throwable light entering what is considered a successful trajectory (hereafter referred to a "successful pitch") is characterized by a rapid increase in acceleration, detectable by a sensor such as an accelerometer. Alternatively, a successful pitch may be detected by determining if acceleration is positive and velocity exceeds a predetermined threshold, also detectable by a sensor such as an accelerometer. Activation contingent on the detection of a successful pitch alone will not prevent an unintended activation if the throwable light is accidentally pitched directly at the ground.

A throwable light exiting a successful trajectory hereafter referred to as a "successful impact") is characterized by a rapid decrease in acceleration, detectable by a sensor such as an accelerometer or the type commonly used for deploying airbags. Activation upon the detection of a successful impact alone will not reliably ensure activation if the throwable light decelerates during its flight (passing through tree branches, for example) or is cushioned upon landing. Furthermore, activation contingent on the detection of a successful impact alone will not prevent an unintended activation if the throwable light is accidentally pitched directly at the ground.

A throwable light source thrown into a useful trajectory is characterized by experiencing a continued period of deceleration for a predetermined time as the light source approaches its apogee. The time during which a throwable light is in ascent is measureable. Such a period of ascent is followed by a moment of zero velocity (at apogee) and then an increase in velocity (passing the apogee). The successful trajectory can be defined by one in which the period of ascent exceeds a predetermined window of time. Such a definition of a useful trajectory (hereafter referred to as a "successful trajectory") can be used to distinguish a useful trajectory from a balked pitch, a drop onto the ground or a misfire into a wall at close proximity to a pitching machine. Such a definition of a successful trajectory is also useful in that it can be determined before the light source reaches its apogee, thereby allowing any number of events to occur after the apogee while still continuing with an activation sequence.

Given the above described means for detecting a successful pitch, successful impact and successful trajectory, the following operations can improve performance of a throwable light by preventing accidental activation of the light source:

In one embodiment, an activation sequence is initiated if a successful pitch as defined above is followed, within a predetermined time (a predetermined maximum time expected to be in flight), by a successful impact as defined above. This embodiment is exampled in the schematic of FIG. 4.

In one embodiment, an activation sequence is initiated if a successful pitch as defined above is followed by a predetermined time (a predetermined minimum time expected to be in flight), and thereupon followed by a successful impact as defined above being detected within a predetermined time (a predetermined maximum time that an impact should have been expected to occur).

In one embodiment, an activation sequence is initiated if a manual signal initiated by the user (such as the wrist-shake of a shake sensor) is followed, within a predetermined time (a predetermined maximum time to allow for a pitch and a trajectory), by a successful impact as defined above.

In one embodiment, an activation sequence is initiated if a manual signal initiated by the user (such as the wrist-shake of a shake sensor) is followed by a predetermined time (a predetermined minimum time expected to be in flight), and thereupon followed by a successful impact as defined above being detected within a predetermined time (a predetermined maximum time that an impact should have been expected to occur).

In another embodiment, an activation sequence is initiated if a change in inertia exceeds a predetermined threshold. Such a measurement would prevent, for example, activation of a light source after an accidental drop of a throwable light from a user's hand to the ground characterized by a relatively low-G impact. For tactical applications in which relatively high G pitches are anticipated, a sensor such as an airbag sensor may be useful in making such a determination.

In another embodiment, an activation sequence is initiated if the throwable light source determines that it has experienced a successful trajectory as described above, one in which the throwable light has been in an ascent phase of its trajectory for a predetermined time.

In another embodiment, an activation sequence is initiated if a rapid acceleration (e.g. pitch) is detected followed by the detection of a period of ascent (continued relatively slow deceleration) for a predetermined time. Such a determination enables a successful trajectory to be defined prior to the light source reaching an apogee.

In another embodiment, an activation sequence is initiated if a manual signal initiated by the user (such as the wrist-shake of a shake sensor) is detected and followed by the detection of a successful trajectory as described earlier, one in which the throwable light has been in an ascent phase of its trajectory for a predetermined time.

In another embodiment, an activation sequence is initiated if the throwable light source has reached a predetermined altitude. This type of measurement can prevent unintended activation due to any event below a predetermined altitude. Such a determination may be made with the use of an altitude sensor. Calibrated is anticipated to normalize absolute altitude above sea level to the ground level of the user or pitching machine.

Embodiments described herein that are intended to reduce the probability of an unintended activation may be combined to further reduce this probability. For example, a determination that a throwable light is decelerating toward an apogee can be required along with a determination that the throwable light has reached a predetermined altitude before an activation sequence is initiated. Such a determination would be valuable in situations where accidental or premature activation could endanger the user.

Shake Sensor

In another embodiment of the throwable light source of this invention, the apparatus comprises a shake sensor capable of detecting a change in inertia induced by a shake of the user's wrist while being grasped. It is anticipated that an accelerometer and processor, as exampled by IMU 108 and logic unit 102 of FIGS. 1, 2 and 3, are capable of operating as a shake sensor.

In operation of such an embodiment, based on an input signal from IMU 108, logic unit 102 discerns a user-generated shaking motion from other normally anticipated changes in inertia (i.e. bounce, throw, pitching machine acceleration, impact at the end of an airborne trajectory, etc.). Upon a determination that the apparatus has been shaken by the user's wrist, logic unit 102 functions as a switch to control the power state of LEDs 104 and 105. In this regard, the combined function of IMU 108 and logic unit 102 functions together as a shake sensor switch.

The advantage of a shake sensing switch in a throwable light source as described allows the apparatus to be activated, deactivated and otherwise controlled while being handheld, in a single hand, while being hermetically sealed from corrosion and tampering.

Another advantage of a shake sensing switch in combination with a throwable light source is that it provides a means for the light source to be activated and deactivated by a user wearing thick gloves or otherwise limited to applications of gross force on the apparatus but not precise tactile input.

Another advantage of a shake sensing switch in combination with a throwable light source is that it provides a means for the light source to be activated and deactivated in the dark, discretely, without need for visibly seeing a switch or display.

A 3-axis accelerometer is ideally suited as a shake sensor for a throwable light source. The human hand and wrist are capable of exerting a unique lateral shaking movement to a handheld object, a motion detectable by a 3-axis accelerometer and discernable by a processor as a signal not ordinarily expressed on a thrown or projected object when airborne, bouncing, rolling, floating or otherwise deployed.

A 3-axis gyroscope is also ideally suited as a shake sensor for a throwable light source. The human and wrist are well-suited to exerting an oscillating shaking motion about a central axis of a handheld object (with a center of rotation on axis with the user's forearm). An oscillation along one axis is another motion that is not ordinarily expressed on a thrown or projected object when airborne, bouncing, rolling, floating or otherwise deployed. A sequence of one or more pauses, with oscillations of one or more periods, allows for the user to generate a plurality of commands, including but not limited to activation, sleep, activate after delay, deactivate and status request.

It is anticipated that shake sensor switch may require a signal from a timer, such as a signal from timer 110 to logic unit 102, to discern a wrist-induced shake from a false positive inertial change such as a bounce, roll or throw, as might also be measureable and signaled to logic unit 102 by IMU 108.

A timer provides the means to measure time intervals (e.g. pauses) between user-initiated wrist shakes, enabling the user to issue a range of commands by timing wrist shakes of the apparatus as earlier described.

In one embodiment, the user operates the apparatus by shaking it to start an LED activation sequence, and shakes the apparatus a second time, within a predetermined time period, to deactivate the LED activation sequence. The LED activation sequence may result in powering the LEDs to immediately illuminate the environment before the user has thrown the apparatus. The LED activation sequence may use a timer circuit, resulting in the LEDs illuminating the environment after a predetermined time period such as 30 seconds, allowing the user to throw the apparatus and the apparatus to travel through its trajectory before the LEDs illuminate the environment.

In operation of this embodiment, the activation sequence may be initiated if logic unit 102 determines that the user has shaken the apparatus, but had not shaken the apparatus within the 5-second time interval prior to the current wrist-shake event. While complex activation sequences are further described herein, the activation sequence of one embodiment is one in which logic unit 102, based on a signal from timer 110, waits a predetermined delay interval and subsequently allows power to flow to LEDs 104 and 105, producing light to illuminate the environment. The delay allows the user to throw the ball into an airborne trajectory without the LEDs being visible until after impact at the end of the trajectory. In this embodiment of the apparatus, if a shake of the user's wrist is detected by logic unit 102 within a 5-second interval after the last detected shake, a deactivation sequence is initiated. The deactivation sequence of this embodiment is one in which logic unit 102 prevents power from flowing to LEDs 104 and 105.

With the combination of a timer and an inertial measurement sensor, the LEDs can be enabled at a predetermined time following the acceleration of the apparatus into its trajectory. For example, a triple-axis accelerometer can be monitored by the processor to determine if the apparatus is pitched into an airborne trajectory, upon which the processor can delay 30 seconds before illuminating the LEDs. Such an event flow would prevent the trajectory from being visible.

Haptic Feedback

Haptic feedback allows the user to receive tactile confirmation that an activation sequence or deactivation sequence has been initiated. Such feedback is invaluable in a throwable light source because it provides the user with necessary status information without revealing location (as a status LED or display would). Such feedback is also advantageous because the apparatus is expected to be handheld in a position that is not likely to be in front of the user's eyes.

A vibrating motor embedded within the housing of the apparatus is a preferred means of providing haptic feedback. An advantage of a vibrating motor for feedback in a throwable light source is that it can be sensed by the user of the apparatus through a thick glove. Another advantage of a vibrating motor is that it can be activated in the dark, discretely (unlike LEDs or other feedback means that reveal the user's location).

Figure 5:
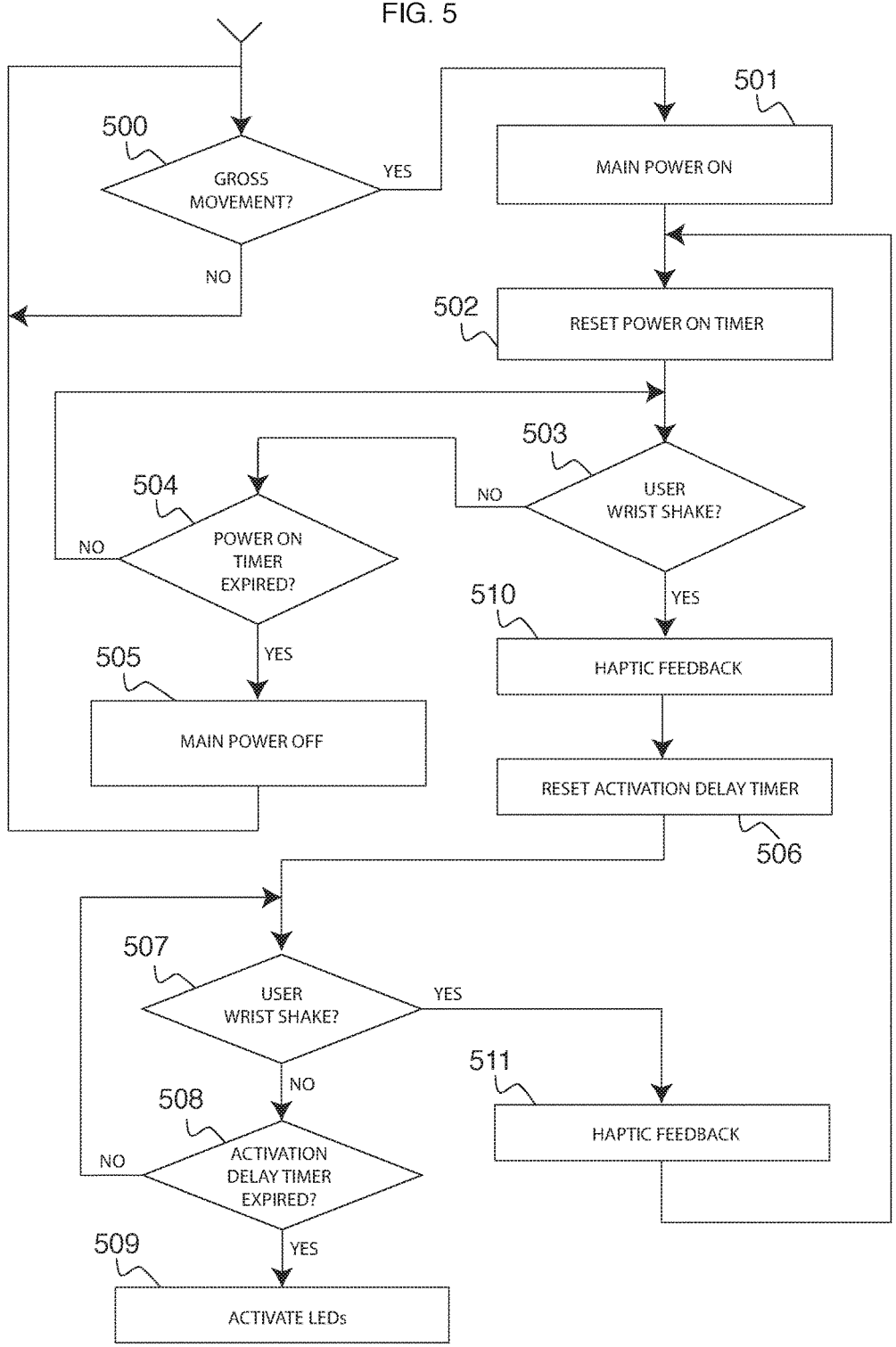
FIG. 5 shows a schematic diagram of a throwable light source according to an embodiment the present invention that provides haptic feedback to its user.

FIG. 5 illustrates an example flow diagram of a method for user-activation of LEDs, with haptic feedback to confirm activation. The advantage of haptic feedback in this workflow is that the operation of the throwable light source does not reveal the location of the user or arc of the airborne trajectory, in accordance with example embodiments. The method may be implemented by a single apparatus such as, for example, a logic unit, sensors, timer and LED embedded within the throwable light source of this invention. The order of the blocks shown in FIG. 5 is an example. The blocks may be arranged in other orders, each function described in each block may be performed one or more times, some blocks may be omitted, and/or additional blocks may be added.

The flow of FIG. 5 demonstrates an example where the user of the throwable light shakes the apparatus to activate it, and shakes the apparatus a second time to deactivate it. The method may begin at block 500.

In block 500, the method may determine if the apparatus is being moved. Such a determination may be made by reading a gross movement sensor; or a mechanically-activated movement sensing switch such as a mercury switch; or other low-power movement-sensing circuit. It is anticipated that the sensing and switching logic of a gross movement circuit requires no power or low power, with block 500 representing a determination made without rapidly draining the power source of the apparatus.

In block 501, the method may include powering up and initializing a logic unit, sensors and timers. In block 502, the method may include the resetting of a "power on" timer. In block 503, the method may include a determination of whether the apparatus has been shaken by the user's wrist. Such a determination may be made, for example, using successive readings of a triple-axis accelerometer. In block 510, haptic feedback is provided to the user to indicate that the wrist shake sensed in block 503 was detected and further acknowledging to the user that an activation sequence has been initiated. Such haptic feedback may be achieved using a vibration motor, vibrating the apparatus in the user's hand for a brief interval. In block 506, the method may include resetting an activation delay timer; the activation delay timer providing a means to delay illumination of LEDs by a predetermined time to allow time for a user-initiated deactivation or other intentional delay window.

In block 507, the method may include a determination of whether the apparatus has been shaken by the user's wrist. Such a determination is made subsequent to the first determination of a wrist shake of block 503. A determination of a wrist-shake in block 507 may be made, for example, using successive readings of a triple-axis accelerometer. In block 511, haptic feedback is provided to the user to acknowledge that the wrist shake sensed in block 507 was detected, and further indicating to the user that a deactivation sequence has been initiated. Such haptic feedback may be achieved using a vibration motor, vibrating the apparatus in the user's hand for a short interval.

To differentiate the haptic feedback of block 511 from the haptic feedback of 510, the types of feedback may be differentiated. For example, the haptic feedback of block 511 may be produced by pulsing a vibrating motor twice, for two successive brief intervals with a pause in between vibrations. The haptic feedback of block 510 may be produced by pulsing the vibrating motor once, for a brief interval. The duration and frequency of vibrations, and one or more pauses between vibrations, as sensed by the user's hand, can indicate to the user that an LED activation sequence is initiated (as would be true if arriving in block 510); or that a circuit deactivation sequence is initiated (as would be true if arriving in block 511); or signaling hardware status to the user (i.e. battery life, operating system number); or signaling the status of a process (i.e. entering sleep mode, wake up from sleep mode, etc.).

In block 508, the method may include determining if the apparatus has been activated for a predetermined period of time before LEDs are actually powered up. Such a delay is called "activation delay" and the resetting of the delay may occur in block 506.

In block 509, the method may include activation of high-intensity LEDs. Condition for arriving at block 509 requires the positive determination that the apparatus has been shaken by the user but not shaken a second time; and the positive determination that a predetermined amount of time, namely the predetermined activation delay, has expired.

In block 504, the method may include the determination that the device has been powered up for an extended period of time. Such a determination, if made at block 504, would indicate that the ball was either moved (determined in block 500) but not shaken (determined in block 503); or shaken (determined in block 503) and shaken again to deactivate (determined in block 507); in either case capable of being powered down. In block 505, the method may include powering down the apparatus. Power down at block 505 does not prevent the gross movement sensor monitored in block 500 from continuing to function.

In another embodiment, as an alternative to a feedback-generating device within the throwable light source housing, haptic feedback may be provided by an external accessory device, such as a wristband comprising a receiver and vibrating motor. Such a haptic feedback accessory can be activated wirelessly through a transmitter on the throwable light source. In this configuration, the user initiates a command by interacting with the throwable light source (i.e. shaking the apparatus) and, in response to the user command, the throwable light source transmits a command to the external accessory (i.e. wristband receiver and vibrating motor) which itself provides haptic feedback to the user as a response to the command (i.e. acknowledgement, failure, low battery, etc.).

Figure 6:
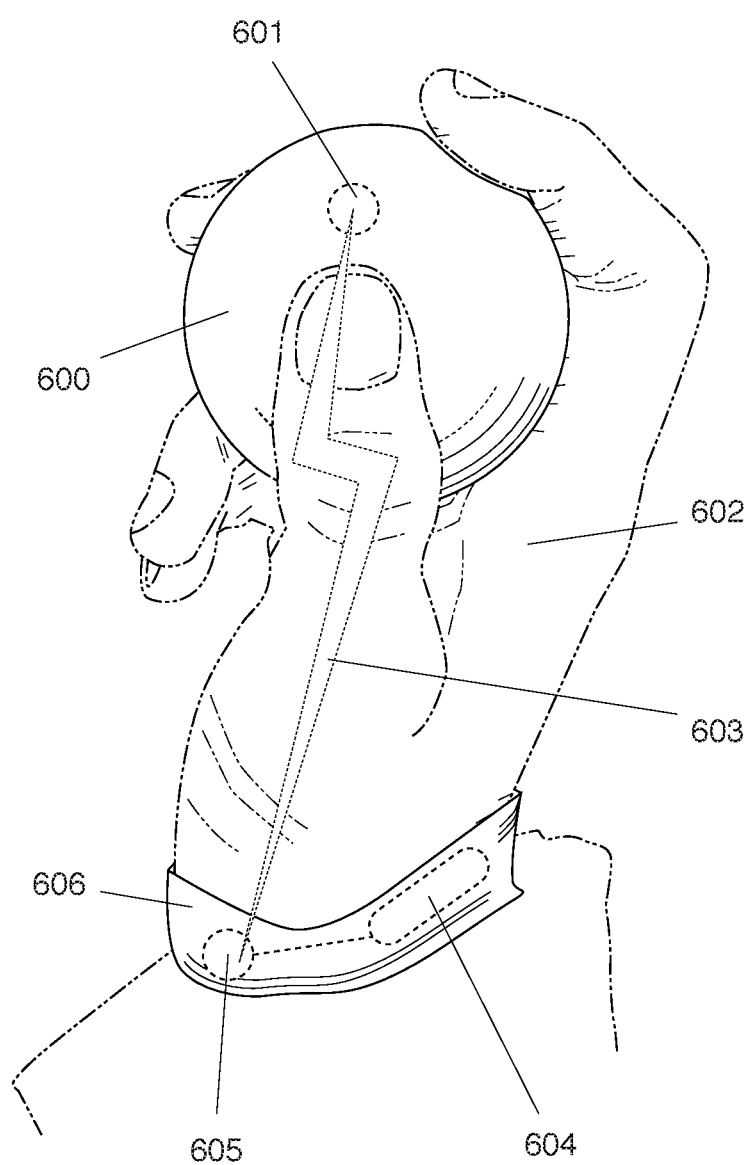
FIG. 6 illustrates a user of the throwable light source of the present invention receiving haptic feedback through an associated wristband.

An example configuration of a throwable light source with an external haptic feedback accessory is shown in FIG. 6. Throwable light source 600 is held by user 602. Wireless transmitter 601 is embedded within the housing of throwable light source 600 and operably connected to LED activation circuitry within throwable light source 600, said light activation circuitry examplifed in FIGS. 1, 2 and 3 and other embodiments described herein. Wireless receiver 605 is embedded within wristband 606. Transmitter 601 communicates with receiver 605 as shown by transmission icon 603. Haptic feedback device 604 is hardwired to receiver 605 and comprises a vibration generating motor. In operation, throwable light source 600 causes wristband 606 to vibrate in order to provide an acknowledgement to user 602 of receipt of a command (i.e. activate LEDs, deactivate LEDs, etc.), or to provide data to user 602 regarding the status of throwable light source 600 (low battery, etc.). An example flow of user interaction with the throwable light source along with two opportunities for haptic feedback through wristband 606 is provided in the block diagram of FIG. 5.

It is anticipated that the external haptic feedback device, exampled in FIG. 6 as a wristband, may be embedded in a portable or wearable accessory including but not limited to jewelry such as a finger ring or necklace, gloves, socks, pant lining, hat lining, keyring, etc.

It is anticipated that the haptic feedback mechanism, exampled at 604 in FIG. 6 as a circuit including a vibrating motor, may employ alternative tactile means for indicating feedback to user 602. Such means includes without limitation a wearable solenoid capable of providing a push/pull motion on the user's body; application of a safe yet perceptible electrical shock (e.g. characterized by tingling, muscle contracting, etc.) to an arm or a portion of the user's body; or any other haptic feedback means commonly used to provide feedback.

It is anticipated that a feedback mechanism, exampled as haptic feedback mechanism 604 comprising a vibrating motor, may employ non-tactile feedback means as an alternative to haptic feedback. Such means includes without limitation an earpiece capable of providing an audio cue; a discrete visible cue such as an LED embedded within eyewear or on a personal digital display; or any other feedback means commonly used to provide feedback.

Networked Throwable Light Source

In an embodiment of this invention, the logic unit is operably connected to a receiver embedded within the housing of the apparatus; the receiver capable of receiving a control signal from a remote device external to the thrown apparatus and, upon receiving the signal, the logic unit initiating a logical operation including but not limited to activating or deactivating the LEDs. Such a receiver may be a WIFI, radio wave frequency receiver, light sensor for detecting remote infrared or visible signal or other receiver capable of receiving a signal from a transmitter external to the thrown apparatus. Such a receiver may be a transceiver or RFID interrogator in the throwable light source, allowing for the activation or deactivation of the light source upon receipt of predetermined coded information in an associated RFID tag worn by the user.

Figure 7:
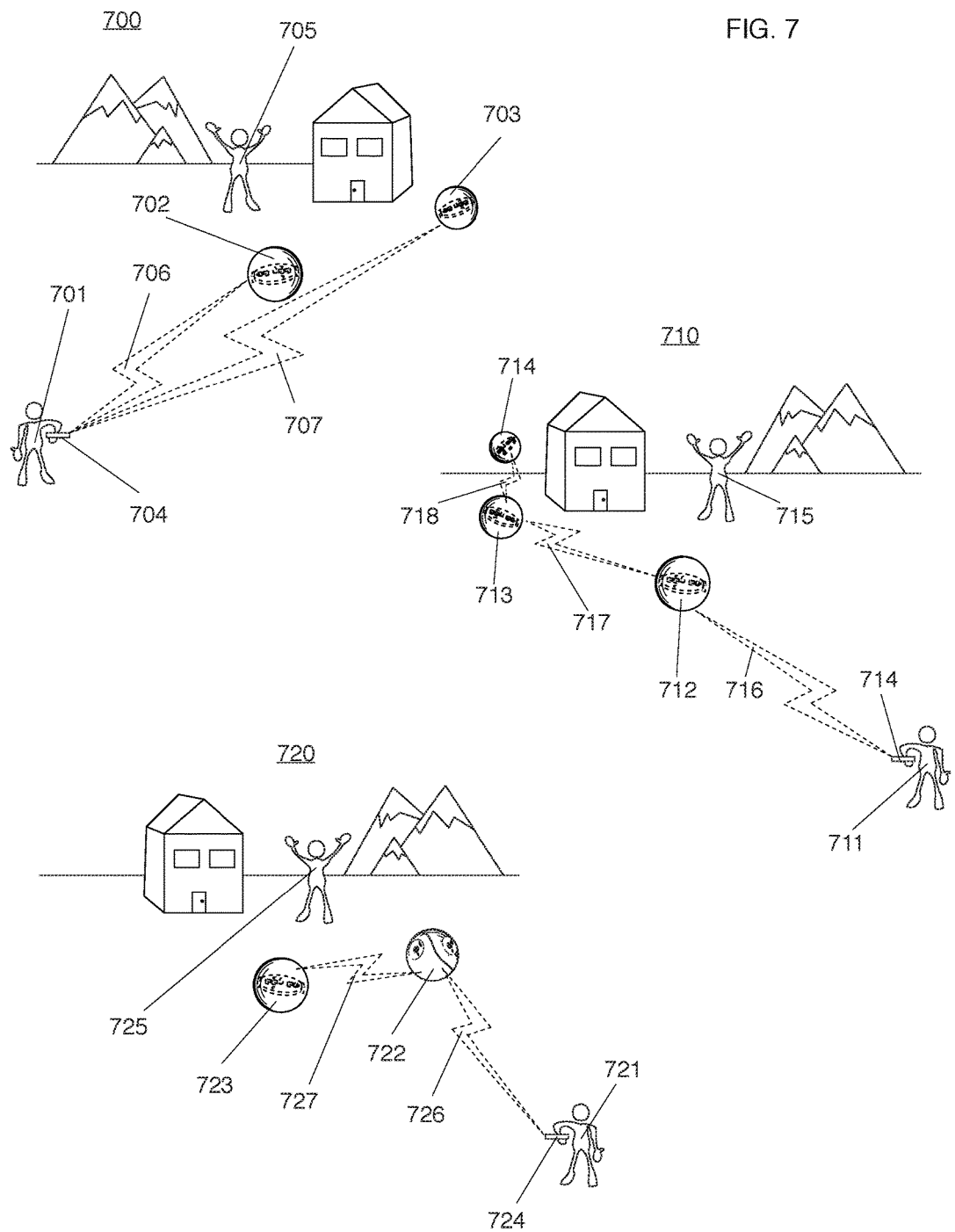
FIG. 7 shows views of environments in which networked throwable light sources and associated network devices are deployed.

FIG. 7 presents various use case scenarios for one or more throwable light sources in a networked system.

A user may toss one or more unlit light sources into a trajectory, then wirelessly transmit a command to each respective tossed light source in order to activate the respective lights. Such an embodiment is illustrated in operation at 700 in FIG. 7. User 701 has thrown (unlit) light source 702 and (unlit) light source 703 in close proximity to subject 705. User 701 operates wireless transmitter 704 which, in response to the user interaction, sends an activation command to a receiver in light source 702 as indicated by transmission icon 706. In synchronicity with the transmission of an activation command by wireless transmitter 704 to light source 702, wireless transmitter 704 sends an activation command to a receiver in light source 703 as indicated by transmission icon 707. The user-initiated wireless transmission from transmitter 704 to receivers in light sources 702 and 703 results in the activation of LEDs in the respective light sources, illuminating subject 705. While this example illustrates an embodiment whereby each throwable light source 702 and 703 receives a unique transmission signal as indicated by transmission icons 706 and 707, it is anticipated that a plurality of throwable light sources may respond to the same wireless transmission signal transmitted from a remote device.

In an embodiment of this invention, a throwable light source comprises a transmitter embedded within its housing that enables the light source to issue an activation command to a receiver embedded in a second throwable light source. With this configuration, throwable light sources are capable of acting as repeaters by receiving and repeating signals initiated by a remote user, as well as returning status and sensor data back to the user through a daisy chain of wireless devices.

In one example embodiment illustrated at 710 in FIG. 7, a user tosses multiple light sources into a trajectory, and then wirelessly transmit a command to one light source in order to activate LEDs in each of light sources. As shown, user 711 has thrown light sources 712, 713 and 714 in close proximity to subject 715. User 711 operates wireless transmitter 714 which, in response to the user interaction, sends an activation command to a receiver in light source 712 as indicated by transmission icon 716. Upon receipt of the transmission of an activation command, light source 712 employs its own onboard transmitter to repeat the activation command to light source 713 as indicated by transmission icon 717. Upon receipt of the transmission of an activation command, light source 713 employs its own onboard transmitter to repeat the activation command to light source 714 as indicated by transmission icon 718. The user-initiated wireless transmission from transmitter 714 to a receiver in light source 712 results in the activation of LEDs in light sources 712, 713 and 714, illuminating subject 715 from three directions. Such a configuration is a wireless daisy chain of light sources, with lights in the chain capable of acting as repeaters to communicate with other light sources.

A plurality of throwable light sources in a single networked system serves to increase the intensity of illumination of an environment with a synchronized cluster of thrown or projected lights; and broadens the coverage of illumination across an environment by a cluster of lights; and provides for selective illumination of portions of an environment with independent activation and operation of each respective light source in the network.

Networked light sources are capable of operating collaboratively towards completion of a variety of shared tasks possible with the utility of one or more lights thrown or projected into an airborne trajectory. Communications may be synchronous or asynchronous.

An embodiment of the throwable light source of this invention may be used in conjunction with a throwable camera to provide illumination for photography or videography. A throwable stroboscopic light source would be advantageous to a throwable camera by reducing or eliminating motion blur associated with the light gathering capabilities of inexpensive image sensors. Multiple thrown light sources further advantage a throwable camera by illuminating a large area. Furthermore, a throwable camera can remain passive while separate, thrown light sources are visible, to prevent detection of the camera.

An example operation of the throwable light source of this invention, used in conjunction with a throwable camera, is shown at 720 in FIG. 6. User 721 tosses throwable camera 722 into a dark environment with the intention of capturing photos and videos of subject 725. User 721 also tosses throwable light source 723 with the intention to illuminate subject 725.

To capture a photograph, user 721 uses wireless transmitter 724 to transmit a capture command to a receiver in throwable camera 722 as shown by transmission icon 726. In response to receipt of the capture command by the receiver of throwable camera 722, throwable camera 722 activates a wireless transmitter within its housing to transmit a "flash" command to a receiver in light source 723 as shown by bidirectional transmission icon 727, instructing the light source to flash a stroboscopic light in synch with the camera. In response to receipt of a "flash" command, light source 723 activates a transmitter within its housing to return an acknowledgement signal wirelessly back to a camera 722 as shown by bidirectional transmission icon 727. The operation results in camera 722 taking a picture of subject 725, with subject 725 illuminated by a stroboscopic flash of light arriving from light source 723, the flash synchronized with the imaging capture logic of camera 722. It is anticipated that camera 722 may issue "flash" commands to one or more throwable light sources on the network to synchronize respective stroboscopic flashes (or activation of continuous illumination) with an image capture operation without first receiving a capture command from user 721.

With a transmitter embedded in the housing of the throwable light source of this invention, the apparatus is capable of communicating its activation status, the status of onboard sensors, the status of external events, and commands intended to activate external devices.

With a receiver embedded within the housing of the throwable light source of this invention, an onboard processing unit can gain access to status updates from one or more additional light sources as well as operational commands arriving from a remote user or from another light source. Such communications would allow, for example, a remote user to activate the light source, to monitor the status of the light source.

The throwable light source network of this invention is understood to be a plurality of devices at least one of which is a throwable light source, each device capable of communicating with at least one other device in the system via wireless connection. Any desired wireless or wired transmission system and method may be used without departing from this invention, including the use of any desired wired or wireless data transmission format or protocol.

It is anticipated that the throwable light source of this invention may produce light visible to the naked eye, as well as light in near and far infrared, ultraviolet or any other spectral range matching that of an imager capable of sensing the environment being illuminated.

It is anticipated that the throwable light source of this invention may be combined with onboard cameras, sensors, receivers, transmitters, power sources, data display and microprocessors and other components embedded within its housing and useful to the user of the throwable apparatus.

Full Spherical Light Output Using Fiber Optic Bundle

It is anticipated that embodiments of the throwable light sources of this invention will comprise embedded LEDs (or other light-producing technology) at the core of the apparatus, emitting light through a translucent or transparent housing. It is also anticipated that embodiments may comprise a plurality of LEDs (or other light producing technology) distributed around the housing of the throwable light source, emitting light from a plurality of points on the housing surface. As represented in assembled view 850 in FIG. 8 and shown in a disassembled view exposing its interior at 800 in FIG. 8, an example throwable light source has battery-powered control unit 801 at its core; and a plurality of LEDs 802 affixed to points distributed around housing 803; each of LEDs 802 having respective power cables 804 operably connected to control unit 801.

In another embodiment of the invention, the embedded light source, for example a high-intensity LED, is connected (e.g. fused to or otherwise disposed to emit light in a direction of) one or more fiber-optic strands, each capable of carrying and projecting light outwardly from a multitude of points distributed around the housing. Such a design is advantageous in that the fiber optic strands allow electronic light-emitting components to be embedded at the core of the apparatus, insulated from impacts and potential tampering.

Another advantage of such a configuration is that a light source embedded at the core of the housing is capable of casting light outwardly, in any and all directions without limitation or obstruction. Another advantage of this design is that the housing can be manufactured of an opaque material, with small-diameter holes, lenses or apertures distributed about the exterior surface of the housing to allow for light emission. Such an opaque construction would allow the throwable light source to appear matte black or camouflaged when inactive, blending into its surroundings.

Figure 8:
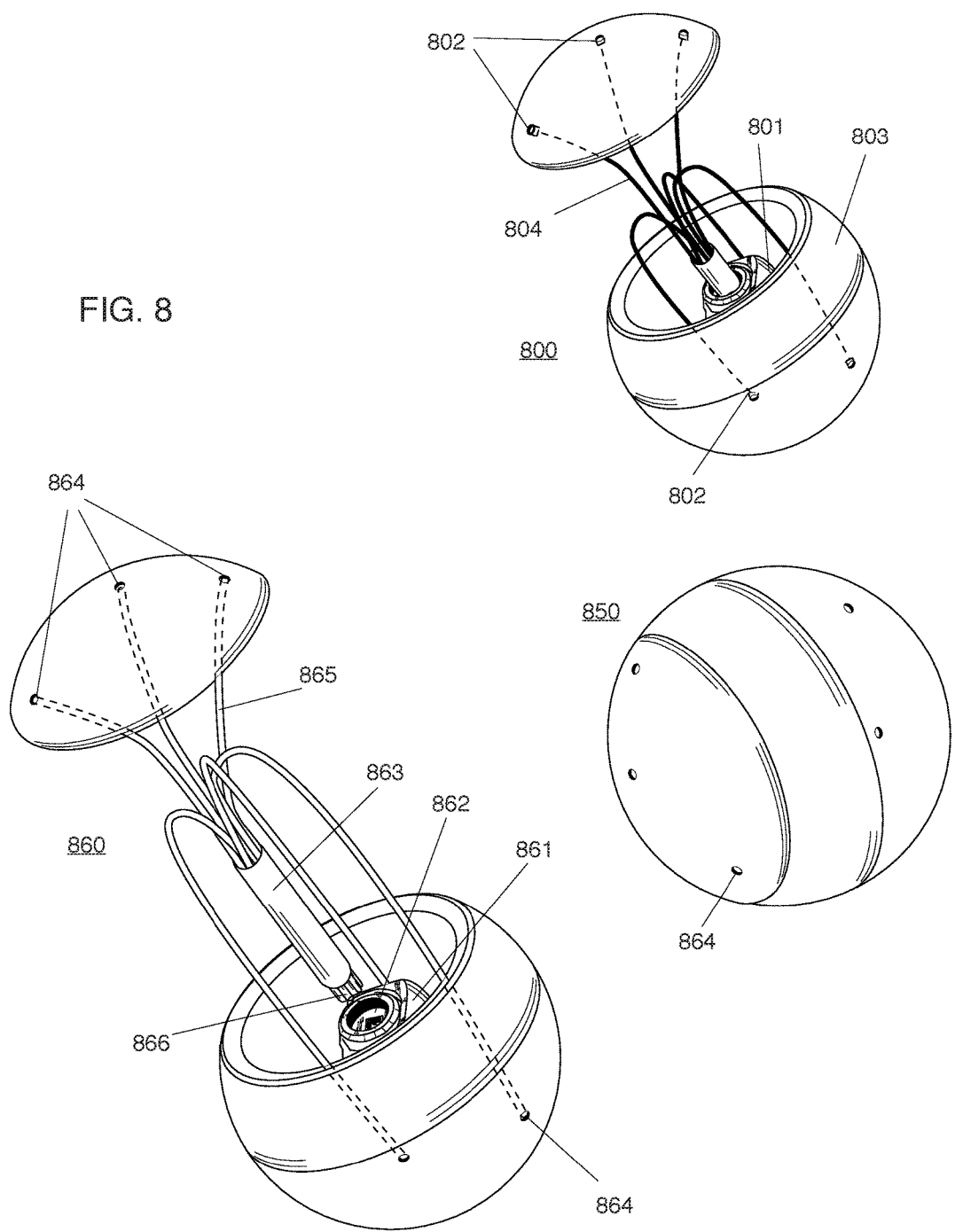
FIG. 8 shows an assembled view and interior views of two example light sources of this invention, one with multiple LEDs distributed around the housing surface and one with fused fiber optic bundles capable of distributing and emitting light from an embedded light source.

An example of the throwable light source of this embodiment is represented by assembled view at 850 in FIG. 8 and shown in a disassembled view exposing its interior at 860. At the core of the sphere, high intensity light source 861 emits light through optical collimating lens 862. Light emitted through collimating lens 862 is focused on proximal end 866 of fiber optic bundle 863, carried through each fiber optic strand 865 and emitted outwardly from respective lenses 864. Light passing through each lens 864 is diverged to expand coverage of illumination of the exterior environment. In this example, lenses 864 are distributed around the entire exterior surface of the sphere to ensure that light is emitted outwardly in all directions.

It should be noted that assembled view 850 is shared by the above description of disassembled views 860 and 800 since both example embodiments appear identical when assembled.

The Oblate Spheroid Shaped Throwable Light Source

An oblate spheroid shaped housing advantages the throwable light source of this invention for particular applications.

A spherical light source with a center of mass located at the center of its housing arrives at the end of its trajectory and rests in an unpredictable orientation. As exampled by scene 900 in FIG. 9, thrown light source 901, having a center of mass at the center point of the sphere, rolls to a resting disposition in a random orientation relative to landing surface 904. In this example, having landed at the shown orientation, LED 902 emits a diverging conical beam of light as indicated by light icon 903. In this particular orientation of light source 901 having been thrown onto landing surface 904, the resulting beam spread of light as indicated at 903 is tilted at an angle to the plane of the landing surface 904. As shown, the environment (intended to be fully illuminated) is only partially illuminated by light source 901. House 907 remains unlit because LED 902 has arrived at rest in a tilted orientation with respect to plane 904 of the landscape on which it landed.

A spherical light source having an eccentric center of mass located at a fixed, off-center point within its housing will be self-righting to reliably arrive at rest on a planar landing surface in an orientation dictated by its center of mass. As exampled at 950 in FIG. 9, high-density mass 951 is molded into the bottom of spherical housing 952. Mass 951 shifts the center of mass of housing 952 away from the center of the sphere, toward a bottom portion of the sphere intended to arrive at rest on landing surface 956. When landing on planar surface 956 after being thrown airborne, housing 952 rolls to a reliably predictable resting position with mass 951 pulled by gravitational force in the general direction indicated by arrow 953, so the intended bottom of the housing (the portion containing mass 951) reliably faces the ground on which the sphere lands. In this orientation, LED 954, affixed within housing 952 to emit light away from the sphere's bottom, will reliably arrive at rest in a skyward-facing orientation where it can emit a diverging spread of light represented by arrows 955 to illuminate a 360 degree panorama across landing surface 956, with minimal light emitted downward directly at landing surface 956.

Unfortunately, a spherical housing having an eccentric center of mass such as exampled at 950, unless thrown and spun precisely so the center of mass leads the housing while spinning axis-forward, will precess about the center of mass as it spins along its trajectory. The precessing of a throwable light source is generally undesirable. A precessing shape in flight is ill-suited to facilitate laminar airflow around its surface, increasing drag and compromising trajectory distance. Because maximizing distance is an objective of a throwable light source, an eccentrically weighted sphere is generally undesirable.

An oblate spheroid shaped light source, even one with a polar axis only nominally smaller than the equatorial diameter, offers an advantage over a spherical throwable light source in that it is capable of arriving at rest in one of two predictable, face-up or face-down orientations. This remains true even if the center of mass of the oblate spheroid shaped throwable light is at the center of its oblate spheroid shaped housing, the optimal configuration for being thrown or projected into a long distance trajectory. For optimal flight, the polar axis of an oblate spheroid must be its axis of revolution when spun into its trajectory (said spin providing rotational stability). When such an oblate spheroid is thrown and comes to rest on a landing surface, an LED fixed within the housing to emit light perpendicular to the polar axis can be reliably predicted to emit light in a cone substantially parallel to the plane of the landing surface. Similarly, when such an oblate spheroid is thrown and comes to rest on a landing surface, an LED fixed within the housing to emit light at any angle relative to the polar axis (excluding the perpendicular instance) can be reliably predicted to emit light in a cone substantially at one of two angles relative to the landing surface, depending on whether the oblate spheroid landed with the face emitting light being face up (e.g. skyward) or face down (e.g. groundward).

An example operation of an oblate spheroid shaped throwable light source is illustrated at scene 970 in FIG. 9. Oblate spheroid light source housing 971 comprises LED 972 centered on and emitting light in a cone centered on polar axis 973. When the oblate spheroid shaped light source is thrown airborne and arrives at rest, its polar axis can be reliably predicted to be generally aligned at a perpendicular to the landscape, as shown by polar axis 973 being substantially perpendicular to planar landscape 975. With its polar axis generally perpendicular to planar landscape 975, the spreading conical beam of light as represented by beam icon 976 emitted from LED 972 is capable of illuminating a 360 degree panorama across the planar landscape 975.

Figure 10:
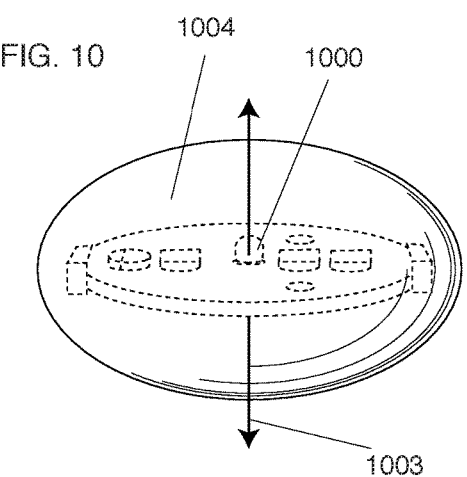
FIG. 10 illustrates an embodiment of a throwable light source with an oblate spheroid shaped housing containing a light source positioned at a predetermined orientation relative to the polar axis.
Figure 11:
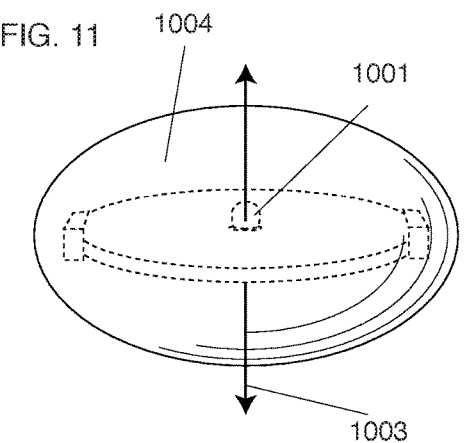
FIG. 11 is a view of the underside of the throwable light of FIG. 10 revealing a second light source positioned at a predetermined orientation relative to the polar axis.
Figure 12:
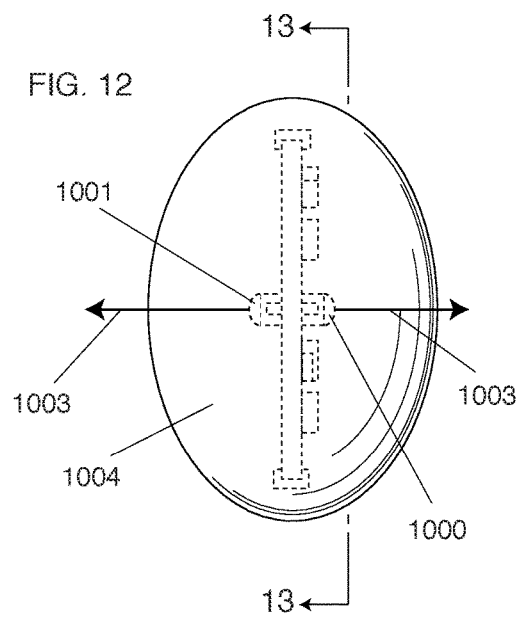
FIG. 12 is a left elevation view of the throwable light of FIG. 10.
Figure 13:
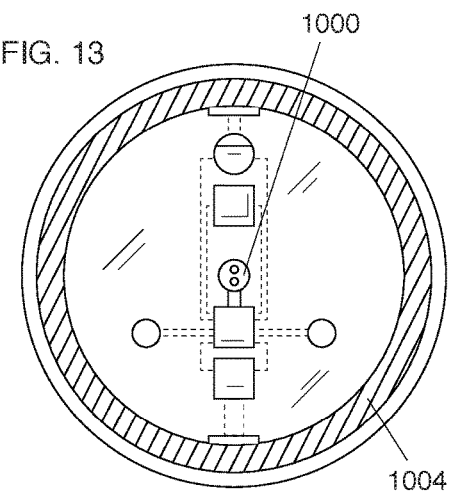
FIG. 13 is a sectional view along line 13-13 of FIG. 12.

As demonstrated by the example oblate spheroid light source housing as shown in the scene at 970 in FIG. 9, a resting position with its equatorial perimeter on a parallel plane with its landing surface allows for the outward projection of light in such a way as to provide optimal illumination of the environment. As shown in a topside view in FIG. 10, an underside view in FIG. 11, a left elevation view in FIG. 12 and a sectional view in FIG. 13, LEDs 1000 and 1001 are positioned within housing 1004 to emit light outwardly along the axis polar axis 1003, so when oblate spheroid housing 1004 comes to rest it is reliably predictable that one of the two LEDs 1001 or 1002 will projecting light in a skyward-facing orientation the other LED will be projecting light facing the landing surface. The light source emitting light away from ground is not only capable of concentrating light where it is needed, it is capable of projecting light with symmetry to both the polar axis and landing surface, and can be optically spread using a diverging lens to illuminate a 360 degree panorama of the landscape.

As an alternative to a diverging lens spreading light in a panorama with symmetry to the landing surface, it is anticipated that multiple LEDs aligned off-axis from the polar axis can illuminate a 360 degree panorama of the landscape. Regardless of the number of LEDs (or lasers, incandescent bulbs, etc.) a significant advantage of the oblate spheroid housing is that it enables light to be emitted in an orientation relative to the plane of the landing surface. Such an advantage (and others described herein) may be expressed with one or more LEDs, or any other light-emitting technology within the oblate spheroid.

Another advantage of the oblate spheroid is that it may be electronically bisected at its widest perimeter, providing the opportunity for selective activation of a skyward-facing half and a ground-facing half. For example, LED 1000 of FIGS. 10 and 12 may be activated if and only if the oblate spheroid arrives at rest with LED 1000 facing skyward. Similarly, LED 1001 of FIGS. 11 and 12 may be activated if and only if the oblate spheroid arrives at rest with LED 1001 facing skyward. Compartmentalizing the two halves of the oblate spheroid conserves power, preventing unnecessary illumination of light in a downward (earth-facing) direction and concentrating light on the illumination of a 360 panorama across the landing surface.

For throwable light source applications requiring high-velocity or long-range trajectories, an oblate spheroid housing moving through air in a vector perpendicular to its polar axis offers an improved response to aerodynamic forces by comparison with a spherical housing. An illustration of the typical aerodynamic responses of a sphere is shown at 1400 in FIG. 14. Spherical light source housing 1401, when thrown in direction 1406, meets opposing headwind 1403. A spherical housing, when thrown through air, acts as a bluff body. High-speed airstream 1404 moves around and along leading surface 1407, separating at 1402 from trailing surface 1408, inducing the formation of negative pressure wake 1405, which creates drag and compromises trajectory range.

By comparison, as illustrated in scene 1410, handheld oblate spheroid 1411 is seen in a top view spinning about its polar axis and moving in direction 1412 toward headwinds 1416. Air encountering leading surface 1413 moves around and over the leading surface. Because of the improved profile of the oblate spheroid by comparison with a sphere of similar size and mass, headwind 1416 flows in a laminar layer along the surface of the housing with minimal airflow separation at 1415 from the trailing surface 1414. Because of the minimized separation of air off trailing surface 1414, negative pressure wake 1417 has nominal impact on the production of drag by comparison with the behavior of example bluff-shaped sphere 1400. A reduction in the production of drag is extremely advantageous for an embedded light source, offering opportunities for being thrown or projected into a long-range trajectory.

Figure 14:
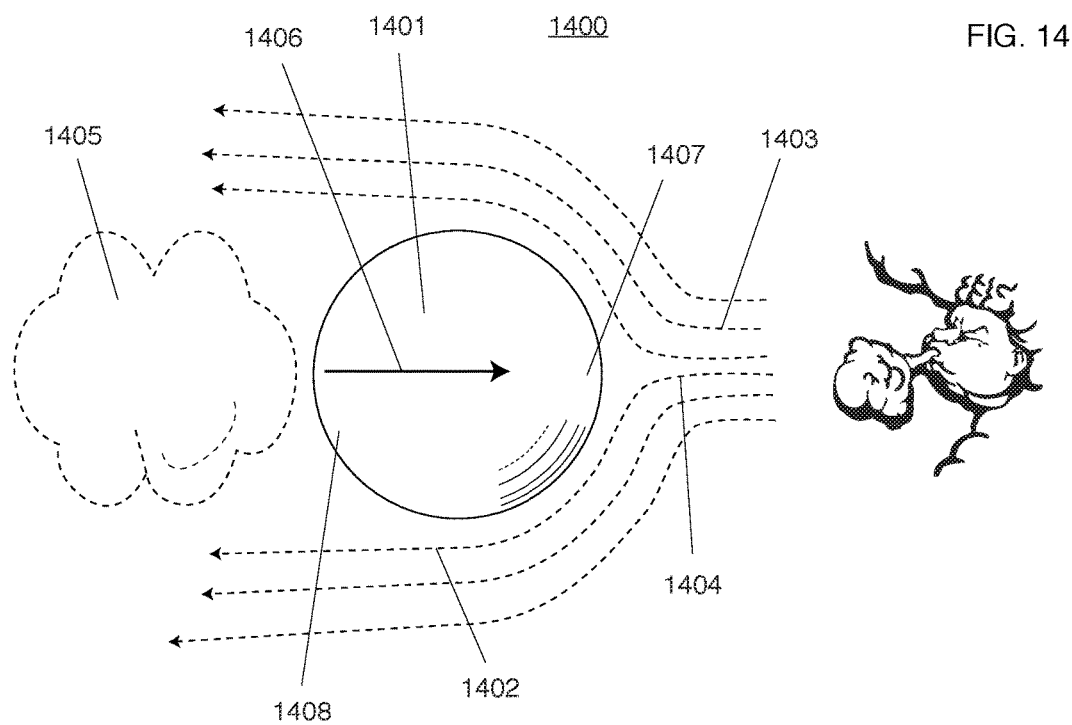
FIG. 14 illustrates an impact of aerodynamic forces on spherical and oblate spheroid shaped housings.
Figure 14:
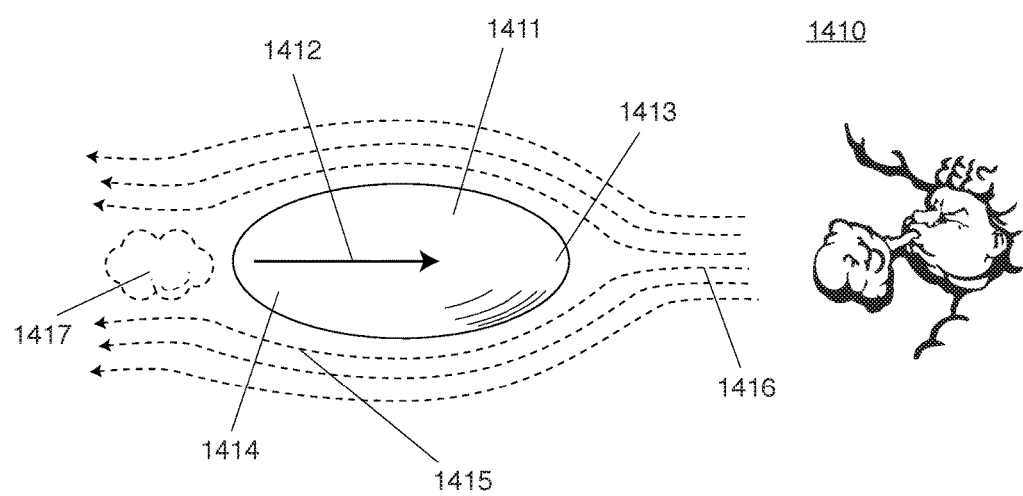

As shown at scene 1410 in FIG. 14, an oblate spheroid shaped throwable light source housing comprises two symmetric faces joined at the equatorial perimeter of the oblate spheroid. The shape of the surface at the equatorial perimeter forms leading edge 1413 which, when disposed to headwinds, moves air in a laminar flow around the two faces of the housing containing necessary electronics. The width of the polar axis of an oblate spheroid relative to the diameter across the equator defines a necessary space to allow for containment of electronics including battery and light source. In this respect, the fact that an oblate spheroid can have a polar axis of a width less than ½ the width of the widest diameter while still being capable of providing necessary interior space and forming a slim profile with an aerodynamic leading edge is a significant characteristic of an oblate spheroid shaped housing in its use for throwable light sources.

Figure 15:
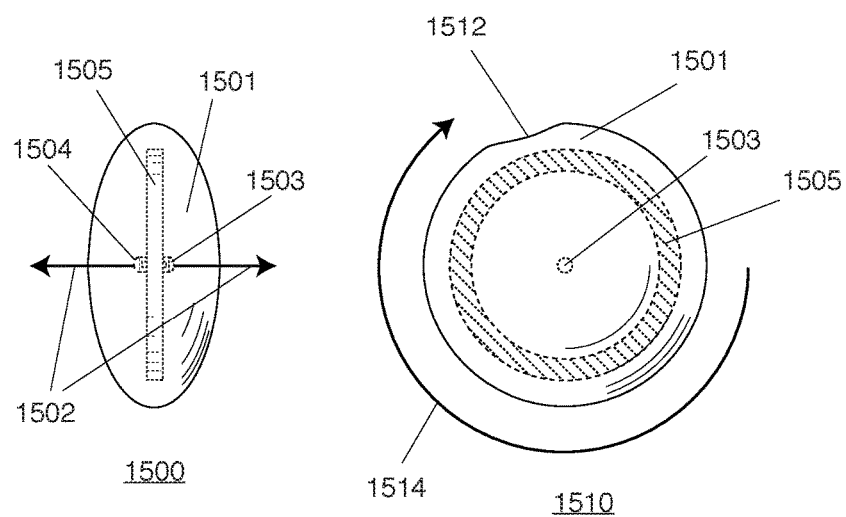
FIG. 15 shows views of an embodiment of a throwable light source with improvements including weighting means for generating angular momentum and means for aligning the user's finger with a predetermined axis of rotation.
Figure 15:
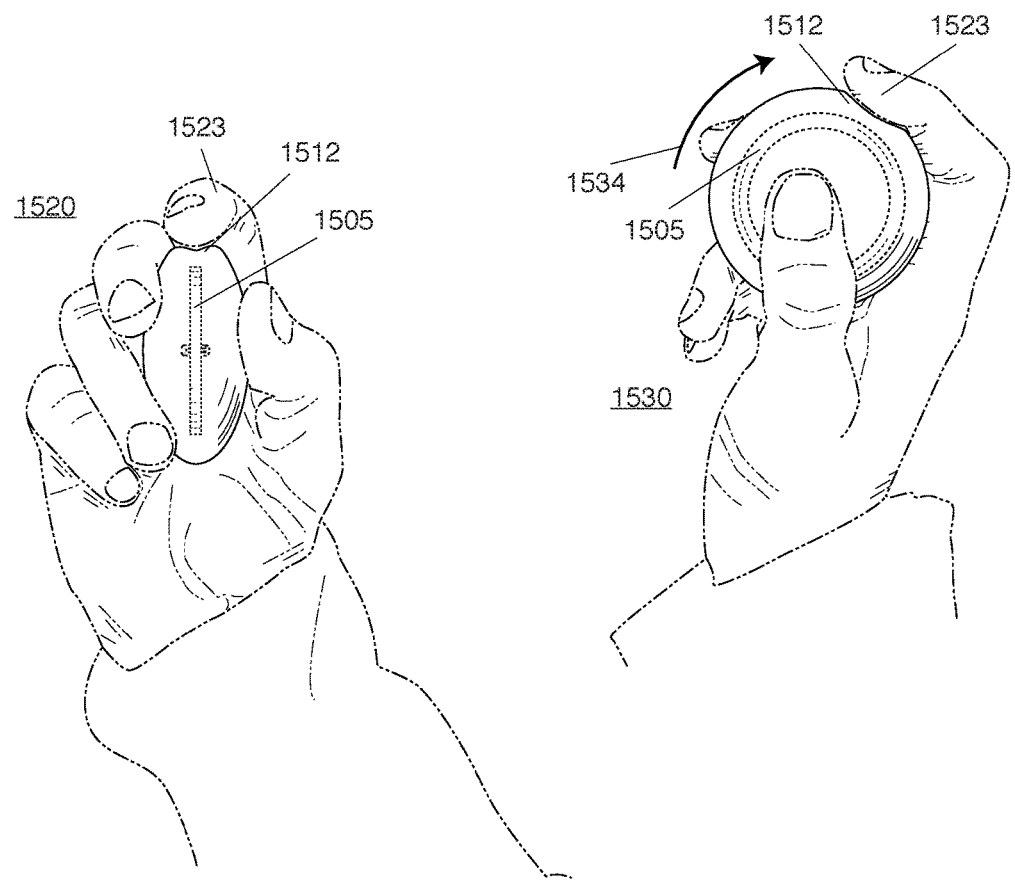

As shown in FIG. 15, the oblate spheroid shape presents the human hand with unique advantages for a throwable light source. The handheld oblate spheroid shaped light source is easily held and spun by the hand to provide rotational stability about the polar axis. While spun by the fingers and wrist, the handheld oblate spheroid is easily thrown on a perpendicular to the polar axis, an optimal orientation for streamlined airflow as shown in FIG. 14, with the improved result being a light source easily thrown into a long-range trajectory. These physical characteristics defining the handheld spinning oblate spheroid are therefore of significant advantage to embedded light sources.

In one example shown in FIG. 15, a light source having an oblate spheroid shaped housing is shown in front elevation view 1500, right elevation view 1510, in a user's hand at front elevation view 1520 and in a user's hand at right elevation view 1530. The light source has LEDs 1503 and 1504 (not visible in right elevation view 1510). For optimal flight, the center of mass of the throwable light source 1501 is centered and located on polar axis 1502, the polar axis being the optimal axis of rotation when spun into its thrown trajectory. Optimal spin is produced around polar axis 1502, indicated in right elevation view 1510 by direction arrow 1514 and also indicated at view 1530 by direction arrow 1534. Such a configuration of housing shape and mass provides the earlier described advantage in response to aerodynamic forces acting on the housing.

A handheld oblate spheroid shaped light source of a compact size and shape as exampled in FIG. 15, is comfortably held in and thrown from the palm of a human hand, and further capable of being easily stored in a pocket or purse.

A handheld oblate spheroid shaped light source housing, comfortably grasped in the palm with a size and shape as exampled at front elevation view 1520 and right elevation view 1530 in FIG. 15, presents its user with another significant improvement over a spherical light source housing in that its shape provides the user with an intuitive, unconscious cue, when the user's hand holds up the apparatus, that easily guides the fingers in alignment with respect to polar axis 1502 so that the fingers pitching the apparatus are in an ideal orientation for spinning and throwing in the optimal orientation for streamlined response to aerodynamic forces (described earlier). By comparison, a spherical light source requiring a particular alignment of the hand grasping the housing for providing an aerodynamic advantage if thrown in a particular manner would require a surface indentation, dimple or other form of tactile identifier for the user to align the sphere properly in preparation for flight.

Gyroscopic Stabilization

A throwable light source may be weighted to generate gyroscopic stability when spun into a trajectory. Producing a large angular momentum around a predetermined axis of rotation advantages a spherical or oblate spheroid shaped throwable light source in a number of ways.

A weighted disc, wheel or other weighting means stabilizes a gyroscope by producing a large angular momentum around the axis of rotation, with the angular force forcing the mass of the ball away from the center of mass, perpendicular to the axis of rotation. Such a gyroscopic force can be incorporated into a throwable light source, with the user of the throwable light source accelerating the gyroscopic-force producing mass into a spin when the apparatus is pitched. It is necessary for the user of the light source to be aware of the physical disposition of an embedded disc or wheel within the housing, if the mass of the disc or wheel is to act as a gyroscope when accelerated into a rapid spin during the pitch of the ball.

As an example, the throwable light source of FIG. 15, shown in front elevation view 1500 and right elevation view 1510, comprises embedded weighted wheel-shaped mass

1505 within housing 1501. The wheel and the housing are fused, glued or otherwise bonded so that they are spun together. It is anticipated that this wheel will be manufactured using metal or other high-density material.

LED 1503 is centered on axis of rotation 1502, on a plane perpendicular to the axis of rotation, emitting light outwardly along the axis of rotation.

As shown at 1520 and 1530, finger indentation 1512 aligns finger 1523 so wheel-shaped mass 1505 can be spun during a pitch around an intended axis of rotation, the polar axis of the oblate spheroid as indicated at view 1500 by arrows 1502. The purpose of the indentation is to help locate the finger on the ball in order to provide a mechanical advantage to the finger, during a pitch, so that spin on the ball is accelerated around the axis of rotation, the spin direction indicated by arrow 1514 and 1534. Wheel 1505 generates angular momentum about the axis of rotation, improving rotational stability and further improving aerodynamic performance by maintaining a stable disposition of the throwable light's leading edge relative to headwinds. It is anticipated that weighting means may be one mass or a plurality of masses with weight distributed with symmetry to the desired axis of rotation.

An oblate spheroid shape with a slim profile, such as exampled in FIG. 15, provides the user with a tactile indication of where the polar axis is oriented. The advantage of finger indentation 1512 increases as the spheroid approaches a spherical shape, as the user's hand no longer can easily determine how the polar axis is aligned. The combined advantages of finger indentation 1512 and weighting means such as mass 1505 are also well-suited to a spherical throwable light source, aligning the user's hand with a predetermined axis of rotation and using mass 1505 to generate angular momentum around the predetermined axis.

While indentation 1512 is an optimal tactile indicator for the user's hand to sense the orientation of an intended axis of rotation, another embodiment of the throwable light of this invention may comprise a surface perturbation such as one or more dimples or pimples for the user's hand or even a single finger to identify the orientation of the axis.

Orientation Sensor and Light Source Activation

A throwable light source comprising an orientation sensor is capable of selectively activating onboard LEDs (or other light-emitting technology) according to the orientation of the housing.

Figure 16:
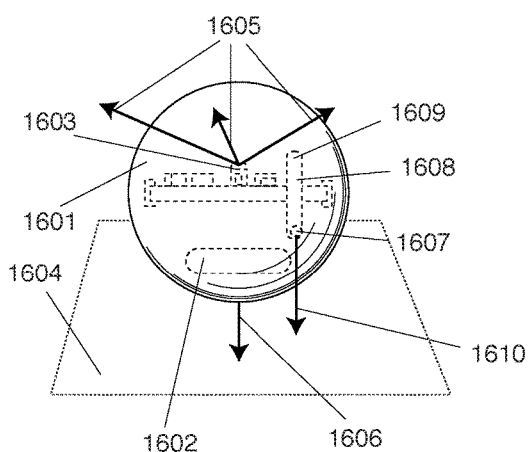
FIG. 16 shows a view of an embodiment of a self-righting spherical throwable light with a mercury switch to activate and deactivate illumination.

An example embodiment of a spherical throwable light source with a crude orientation sensor is illustrated in FIG. 16, in right elevation view 1600 and rotated right elevation view 1650. As earlier described and illustrated at 950 in FIG. 9, the center of mass of spherical housing 1601 may be shifted away from the center of the sphere by embedded high-density mass 1602. The purpose of mass 1602, described earlier and illustrated in FIG. 9, is to ensure that when light source 1603 is thrown into an airborne trajectory, it reliably rolls from any random landing orientation on landing surface 1604 to a final resting orientation with the intended bottom portion of the housing (the portion containing mass 904) closest to landing surface 1604, an orientation determined by gravitational forces acting in the direction represented by arrow 1606 with respect to landing surface 1604. Such an orientation ensures in this example that light source 1603 is optimally oriented to emit light around a 360 degree panoramic scene as indicated by arrows 1605.

Mercury globule 1607 within glass tube 1608 is, when operably functioning as a switch to close a circuit, examples a crude orientation sensor. Gravitational force acting on mercury globule 1607 causes the globule to seek the closes point within tube 1608 to landing surface 1604. At rest (predominately subject to gravitational force), when end 1609 of tube 1608 (and LED 1603) is facing skyward, mercury globule 1607 is pulled toward the landing surface in the direction shown by arrow 1610, thereby closing a circuit. Such a mercury switch, in a circuit with LED 1603, can switch the activation state of the LED according to orientation of sphere 1601. In operation, such a switch could reliably activate LED 1603 when sphere came to rest in an orientation with the hemisphere containing LED 1603 facing skyward and the opposite hemisphere facing landing surface 1604. It is anticipated that a solid state orientation sensor would be an optimal substitute for a mercury switch, and also anticipated that other orientation sensors described herein may be used.

Figure 17:
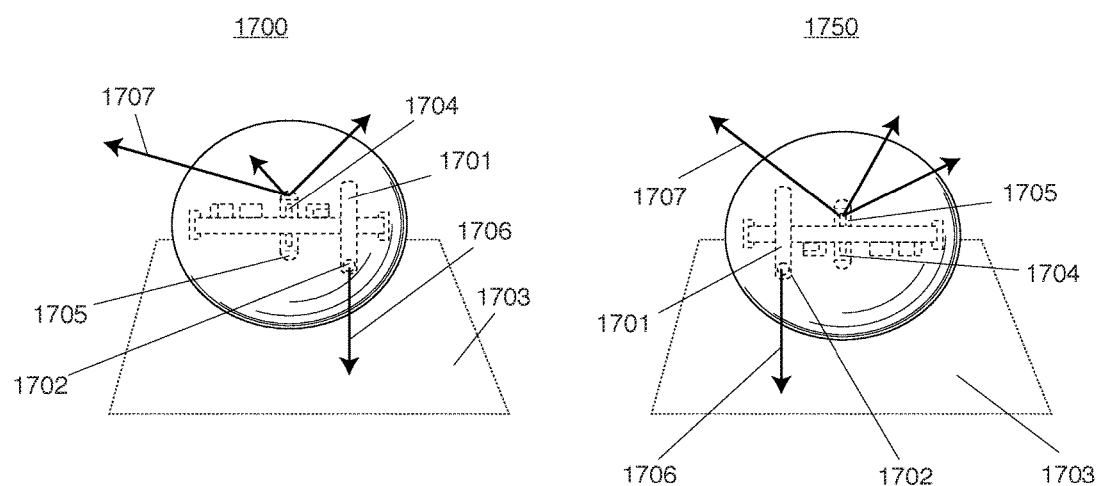
FIG. 17 shows a right elevation view and an upside-down right elevation view of an embodiment of a self-righting, oblate-spheroid shaped throwable light with a mercury switch to select regions for illumination.

An embodiment of a throwable light source having an oblate-spheroid shaped housing and an orientation sensor is exampled in right elevation view 1700 and upside-down right elevation view 1750 of FIG. 17. Mercury globule 1702 always seeks a resting point in the glass tube of mercury switch 1701 closest to ground plane 1703, predominated by gravitational force as represented by arrow 1706. In the circuit of this example, mercury switch 1701 closes a circuit to provide power to either LED 1704 or LED 1705 when mercury globule 1702 is at either end of the glass tube. When the oblate spheroid shaped throwable light source arrives at rest in the orientation shown at 1700, mercury globule 1702 closes a circuit in the portion of its glass tube closest to ground plane 1703, activating LED 1704 as indicated by arrows 1707 and deactivating LED 1705. When the oblate spheroid shaped throwable light source arrives at rest in the orientation shown at 1750, mercury globule 1702 closes a circuit in the portion of its glass tube closest to ground plane 1703, activating LED 1705 as indicated by arrows 1707 and deactivating LED 1704. This example embodiment illustrates the combined advantage of an oblate spheroid housing with an orientation sensor to determine which one (or multiple) LEDs should be activated, depending on the one of two possible orientations that the light source comes to rest at on the landing surface.

The activation of one or more LEDs (or other sources of light) based on the orientation of the throwable light source housing, whether airborne or at rest, allows light to be directed at a particular target. The advantage of such targeting is multifold, allowing for conservation of battery power, concentration of light where needed, spotlighting of a subject of interest (even to the accuracy of an individual laser beam). It is anticipated that the focusing of light on a particular subject according to a signal from an orientation sensor may be improved with the use of mirror galvanometers, mirrors, lenses and any number of mechanical devices capable of redirecting light emitted from a point source.

Throwable Lighting System

Figure 18:
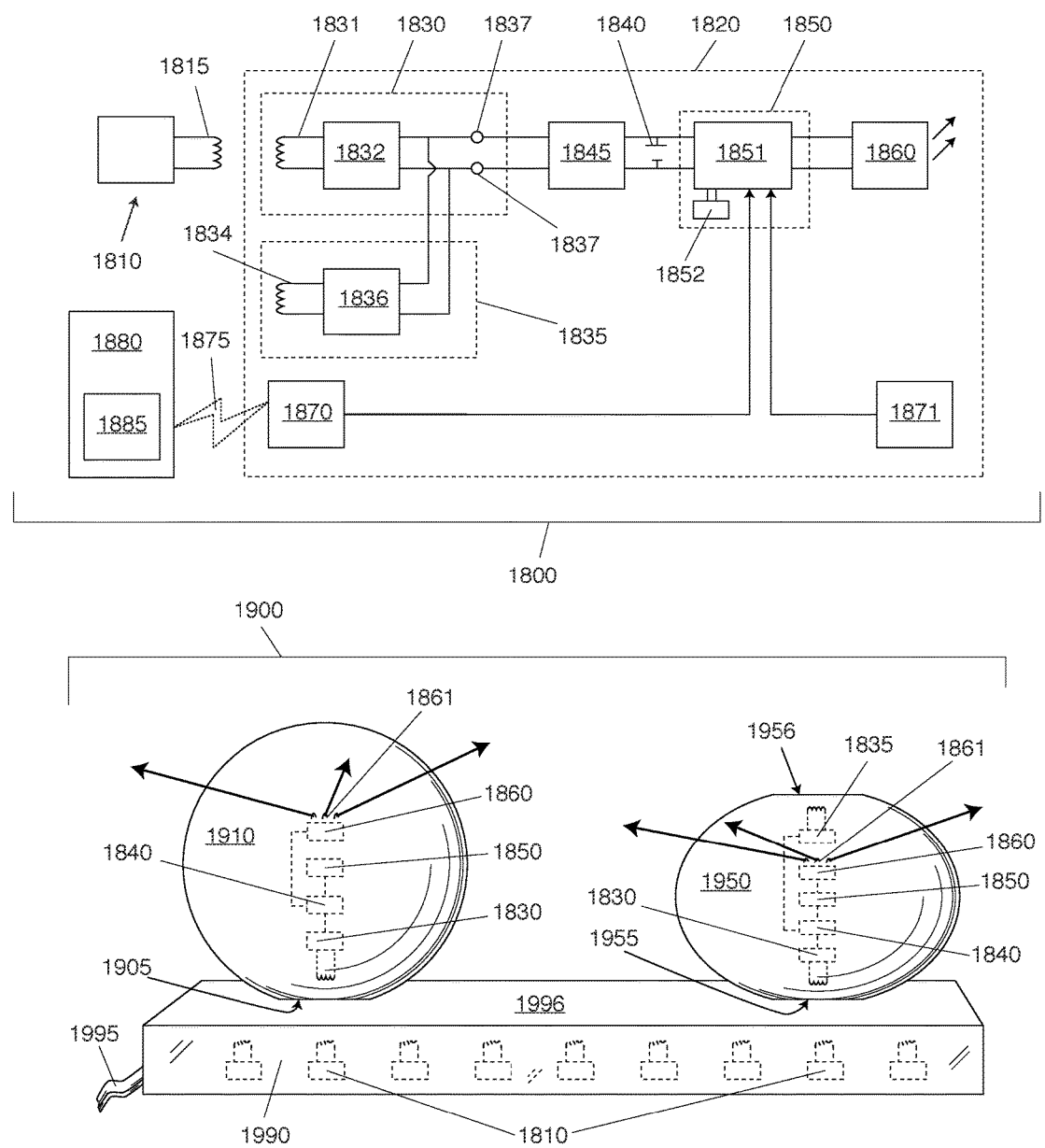
FIG. 18 shows a schematic diagram of a throwable light source system with a throwable light battery charged by induction and a view of the system in operation.

Schematic diagram 1800 in FIG. 18 illustrates an embodiment of a throwable lighting system according to the present invention. The lighting system comprises: a battery charger 1810; a throwable light module 1820; and an optional switching arrangement 1880. The battery charger 1810 provides power from a mains supply to the throwable light module 1820.

The battery charger 1810 includes a primary coil 1815 for inductive coupling to the light module 1820. As such, the battery charger 1810 does not have any exposed electrical connections. The primary coil 1815 has a toroidal winding. This battery charger 1810, via the outlet of coil 1815, may correspond in shape and size to a charging plate having a mounting surface suitable for supporting in close proximity with substantially spherical and oblate spheroid shaped throwable light sources.

The light module 1820 may correspond approximately in shape and in size to a handheld, substantially spherical or substantially oblate spheroid shaped throwable light source, the housing of the throwable light source comprising at least one connecting portion. The lighting module 1820 comprises a power receiving device 1830 and, optionally, at least one additional power receiving device 1835; a battery 1840; and a light source 1860. The light module 1820 receives power from the coil 1815 of the battery charger 1810 through the power receiving device 1830, and uses this to power light source 1860. An optional signal receiver 1870 receives from the corresponding optional switching arrangement 1880, the switching signal as represented by wireless transmission icon 1875 which is used to control the light source. The optional signal receiver 1870 is positioned in the housing, such that the switching signal 1875 is received wirelessly without exposed electrical connections between the light module 1820 and switching arrangement 1880. An optional at least one sensor 1871, which may comprise an orientation sensor to detect the orientation of the light module, is used to control the light source. The optional at least one sensor 1871 may comprise a sensor capable of detecting an external event, such as a movement by a person in close proximity to the light module.

The power receiving device 1830 comprises a secondary coil 1831. The secondary coil 1831 is located in a connecting portion of the light housing and is positioned such that, when the light module 1820 is supported in close proximity to the battery charger 1810, the secondary coil 1831 is close to the primary coil 1815 such that a voltage is induced across the secondary coil 1831. The secondary coil 1831 also has a toroidal winding, with a ring diameter such that the secondary coil 1831 may fit within the primary coil 1815 when, for example, a convex exterior surface portion of housing of the light module 1820 is intended to rest within a corresponding concave portion of the exterior surface of the housing of battery charger 1810. In this embodiment, the power receiving device 1830 comprises power controller 1832 for converting the power received by the secondary coil 1831 into the power output 1837.

Optional power receiving device 1835 may be provided in parallel to power receiving device 1830, enabling the light module 1820 to meet in close proximity with battery charger 1810 from an alternate orientation, with secondary coil 1834 in close proximity to primary coil 1815 and secondary coil 1831 away from primary coil 1815. Optional power receiving device 1835 comprises power controller 1836 for converting the power received by the secondary coil 1834 into the power output 1837. Additional power receiving devices in light module 1820 are anticipated.

The battery 1840 of the light module 1820 may be coupled to the power output 1837 of the power receiving device 1830. In this way, the battery 1840 may be charged by the power output 1837. Optionally, a battery charge controller 1845 is provided for controlling the power used for charging the battery 1840.

To allow the throwable lighting system to be switched on and off by a user located away from light module 1820, a light switch 1885 is provided in the optional switching arrangement 1880. The switching arrangement 1880 provides a wireless switching signal as represented by transmission icon 1875 to the light module 1820 which may be used to control whether a light source 1860 of the light module 1820 is on or off. The light module 1820 receives power inductively from the battery charger 1810 and passes this to battery 1840.

In this embodiment, the light module 1820 comprises a logic unit 1850 for controlling the light source 1860. Logic unit 1850 may control the light source depending on a signal from optional sensor 1871. The logic unit 1850 is coupled to the battery 1840 to power the light source 1860 using the output of the battery 1840. In this embodiment, logic unit 1850 comprises processor 1851 and memory 1852. Memory 1852 provides temporary storage of sensor data and data used by processor 1851 and may be non-volatile memory for long-term storage and later recall of settings or data when light module 1820 is in a sleep or power-off state.

Logic unit 1850 may control the light source depending on the switching signal as represented by transmission icon 1875.

An example throwable light source system of schematic 1800 is illustrated at 1900. Substantially spherical throwable light source 1910 and substantially oblate spherical throwable light source 1950 are supported on the upper surface of inductive charging device 1990. Throwable lights 1910 and 1950 are separated from electrical contact with charging device 1990 by insulative plate 1996. Charging device 1990 is comprised of a plurality of battery chargers 1810 each with respective primary induction coils, and is hardwired to a main power supply via power cable 1995.

As illustrated at 1900, the respective connecting portion of the light module housings of throwable lights 1910 and 1950 are configured to meet in close proximity with a connecting portion of the housing of charging device 1990. In the embodiment shown of a spherical throwable light source, the connecting portion of substantially spherical throwable light source 1910 has a planar stabilizing region 1905 to improve a successful mounting with insulative surface 1996, such that power receiving device 1830 within throwable light source 1910 is capable of being supported in close proximity to a battery charger 1810 in charging device 1990.

As further described in this specification and illustrated by mass 951 of FIG. 9, a spherical throwable light source may be advantaged by weighting means to ensure that the disposition of the light source arrives at a predetermined, self-righting orientation on a landing surface. Another embodiment of a spherical throwable light source comprises weighting means to combine the advantages of predetermining the landing orientation of the light source with the predetermined orientation of the secondary coil of a power receiving device for induction charging. This configuration allows a self-righting light to be thrown to illuminate an environment in a predetermined angle with respect to the landing surface (e.g. emitting light in a vector at any predetermined orientation according to its center of gravity) while also enabling the light to be inductively charged after having been casually thrown onto the upper surface of a battery charger. Weighting means causes the spherical housing to roll to an orientation best suited for mating a secondary coil with the primary coil in the battery charger. It is anticipated that further means such as a slightly convex depression on the charging surface will improve alignment between primary and secondary induction coils as the spherical housing comes to its resting position.

In the example of an oblate spheroid shaped throwable light source, one connecting portion of substantially oblate spheroid shaped throwable light source 1950 has planar stabilizing region 1955 to ensure a close proximity to insulative surface 1996, such that power receiving device 1830 within throwable light source 1950 is capable of being disposed in close proximity to a battery charger 1810. In this example embodiment, power receiving device 1835, being positioned in the housing to align its secondary coil in close proximity to planar region 1956, enables substantially oblate spheroid shaped throwable light source 1950 to be tossed or rolled onto charging device 1990 without preference to either face of the substantially oblate spheroid shaped housing, ensuring a successful marriage of battery charger and power receiving device in either a face up or face down orientation.

Pitching Machine Adaptations

It is anticipated that the throwable light of this invention may be projected by a pitching machine, pneumatic cannon, or other long-distance pitching devices ordinarily used for pitching sports balls including but not limited to baseballs and tennis ball pitching machines. For long range trajectories, a gas ($CO_2$)-powered launcher, such as used to fire paint-balls, is anticipated. Spring-powered launchers and gunpowder-powered launchers can also be used to fire individual lights, or groups of lights.

A spherical ball with a textured surface is advantageous in that it improves aerodynamic performance by creating a thin layer of turbulence and thereby reducing drag, a function of goofball dimples, baseball stitching, and tennis ball fuzz.

A textured surface also improves performance when the throwable light is used with commonly used pitching machines, such as dual-tire driven tennis ball pitching machines, aiding the machine in its ability to grip the ball firmly, reducing slippage associated with a smooth surface.

An embodiment of the throwable light source of this invention comprises a spherical housing with a substantially smooth surface and a pattern of perturbations distributed about the entire housing surface. The perturbations may be indentations such as dimples or convex bumps of no more than 0.25" in width. While the preferred shape of a single perturbation is a round concave dimple, it is anticipated that perturbations may be tennis ball fuzz or convex pimples (as on a basketball) or varying in shape and size. To prevent the throwable light source from listing in a particular direction over the course of a high-speed trajectory, the preferred pattern of perturbations are distributed with symmetry around the exterior surface of the housing.

While an oblate spheroid shaped throwable light is not suitable for use in common pitching machines, it is anticipated that surface perturbations may reduce drag when the apparatus is thrown or pitched in an airborne trajectory.

Anticipated Improvements

It is anticipated that all network devices including networked throwable light sources, network sensors, network storage media, network processors and client devices may require local storage for internal operations including but not limited to RAM, flash storage and magnetic media. It is further anticipated that network memory such as a file server may be used for temporary storage as well as archival storage.

It is anticipated that data communicated from one device to another device over a short-range wireless network can alternatively be communicated via a wired connection such as USB or FireWire. Wireless communications may include LAN, WAN, Internet-based connections, WIFI, Bluetooth, satellite and cloud-based systems.

It is anticipated that a light source projected into a trajectory may roll, float, submerge, bounce or otherwise move to the endpoint of the trajectory, the endpoint being the point at which the ball is at rest. The light source of this invention may benefit from operation at any orientations and positions between and including its initial projection point and its endpoint.

It is further anticipated that the throwable light source of this invention may remain continuously operational through its projection into a first trajectory, its arrival at a resting point, its stationary position during a resting period, and its projection into subsequent trajectory. It is anticipated that the throwable light source of this invention may sleep at a resting point in order to conserve power, and awaken when thrown into a subsequent trajectory. It is further anticipated that the throwable light source of this invention may sleep during the airborne portion of its trajectory to conserve power, awakening during the rolling portion of its trajectory, or at a resting point, or at a resting point between multiple trajectories. It is anticipated that a sensor may initiate a sleep mode, or an awaken mode.

It is anticipated that an instruction from a network device may command a network light source to perform a function including but not limited to synchronize timers between network devices; synchronize settings between network devices; load settings from non-volatile memory; save settings to non-volatile memory; initiate sleep mode; power off; power on; reset to factory default state; initiate the firing of a stroboscopic flash; initiate the activation of a continuous illumination; switch modes of operation; designate a master network light source or a slave network light source; designate a frequency for transmission over the network; switch network channels for communication independent of other network devices; enable or disable individual sensors required for operation of a light source; replace input from a sensor with input from a sensor available from a network light source; relay instructions to and from a second network light source; report status of any network light source; relay image and sensor data to and from any network device; serve as a wireless repeater of any received command for the extension of the range of the network. These exemplary instructions should be considered for descriptive purposes and not for purposes of limitation.

It is anticipated that light sources and devices described herein will require components including but not limited to microprocessors, ROM and RAM memory. Light sources and devices described herein that do not expressly comprise components including but not limited to processors, ROM and RAM memory should not be interpreted as having a limitation precluding the light sources and devices from comprising and utilizing such components in any workflow.

The embodiments of light sources described herein are anticipated to be applicable to electromagnetic radiation both visible to the human eye and invisible, including but not limited to ultraviolet and near/far infrared light sources.

It is anticipated that the throwable light source of this invention may activate illumination in response to a signal from one or more onboard event sensors. Event sensors include but are not limited to orientation sensors, position sensors, motion sensors, range-finders, proximity sensors, audio sensors, microphones, light sensors, infrared sensors, vibration sensors, oxygen sensors, co sensors, co2 sensors, hydrogen cyanide sensors, pressure sensors, altitude sensors and temperature sensors. It is anticipated that object recognition technology capable of identifying a subject of interest may be employed as an event sensor.

It is anticipated that the throwable light source of this invention may focus illumination in a particular direction in response to a signal from one or more onboard event sensors. Among its advantages, the spotlighting a target of illumination advantages a throwable light source in concentrating power consumption.

It is anticipated that a throwable light source with a translucent or transparent housing may be self-powered or enhanced by energy generated by passive solar cells encapsulated beneath its exterior surface.

It is anticipated that while the throwable light source of this invention is expected to encounter aerodynamic forces when pitched into the air, it is possible to create an embodiment that operates while in a liquid, for example in a recreational pool or in an ocean, and with all the components working to create a desired effect for the operating environment.

CONCLUSION

The foregoing Detailed Description has disclosed to those skilled in the relevant disciplines how to make and use the system for operating image capture systems of the invention and has also disclosed the best mode presently known to the inventor of making and using such system. It will however be immediately apparent to those skilled in the relevant disciplines that image capture systems made according to the principles of the invention may be implemented in many ways other than the ways disclosed herein. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A throwable camera lighting system comprising:
   a user device comprising a first transmitter for wirelessly transmitting a first signal, and a first processor electrically connected to the first transmitter;
   a first housing suitable for being projected into an airborne trajectory comprising a camera, a first receiver for wirelessly receiving the first signal, a second transmitter for wirelessly transmitting a second signal, and a second processor electrically connected to the camera, the second transmitter and the first receiver;
   a second housing suitable for being projected into an airborne trajectory comprising a first light source, a second receiver for wirelessly receiving the second signal, and a third processor electrically connected to the second receiver and the first light source;
   wherein
   the first processor initiates transmission of the first signal;
   the second processor initiates transmission of the second signal in response to receipt of the first signal by the first receiver;
   the second processor triggers an image capture in response to receipt of the first signal by the first receiver; and
   the third processor activates the first light source in response to receipt of the second signal by the second receiver.

2. The throwable camera lighting system of claim 1 wherein the second processor triggers an image capture and the third processor activates the first light source at a substantially similar moment in time.

3. The throwable camera lighting system of claim 1 wherein the camera is a video camera and the first light source, upon activation, remains activated during the capture of a video.

4. The throwable camera lighting system of claim 1 further comprising:
   a third housing suitable for being projected into an airborne trajectory comprising a second light source, a third receiver for wirelessly receiving a third signal, and a fourth processor electrically connected to the third receiver and the second light source; wherein
   the fourth processor activates the second light source in response to receipt of the third signal.

5. The throwable camera lighting system of claim 2 wherein the first light source is a high-speed stroboscopic flash to eliminate motion blur in the captured image.

6. The throwable camera lighting system of claim 4 wherein
   the second housing further comprises a third transmitter electrically connected to the third processor,
   the third processor initiates transmission of the third signal in response to receipt of the second signal by the second receiver.

7. The throwable camera lighting system of claim 4 wherein
   the second processor initiates transmission of the third signal in response to receipt of the first signal by the first receiver.

8. The throwable camera lighting system of claim 5 wherein
   the first housing further comprises a first timer electrically connected to the second processor;
   the second housing further comprises a second timer electrically connected to the third processor; and
   the second signal is a command indicating a time for activation of the first light source.

9. A throwable camera lighting system comprising:
   a first housing suitable for being projected into an airborne trajectory comprising a camera, a first transmitter for wirelessly transmitting a first signal, and a first processor electrically connected to the camera and the transmitter;
   a second housing suitable for being projected into an airborne trajectory comprising a first light source, a first receiver for wirelessly receiving the first signal, and a second processor electrically connected to the first receiver and the first light source; wherein
   the first processor initiates transmission of the first signal; and
   the first processor triggers an image capture and the second processor activates the first light source in response to receipt of the first signal at a substantially similar moment in time.

10. The throwable camera lighting system of claim 9 wherein the first light source is a high-speed stroboscopic flash to eliminate motion blur in the captured image.

11. The throwable camera lighting system of claim 9 wherein the camera is a video camera and the first light source, upon activation, remains activated during the capture of a video.

12. The throwable camera lighting system of claim 9 further comprising:
   a third housing suitable for being projected into an airborne trajectory comprising a second light source, a second receiver for wirelessly receiving a second signal, and a third processor electrically connected to the second receiver and the second light source; wherein
   the first processor initiates transmission of the second signal; and the third processor activates the second light source in response to receipt of the second signal by the second receiver.

13. The throwable camera lighting system of claim 9 further comprising:
a third housing suitable for being projected into an airborne trajectory comprising a second light source, a second receiver for wirelessly receiving a second signal, and a third processor electrically connected to the second receiver and the second light source; wherein
the second housing further comprises a second transmitter;
the second processor initiates transmission of the second signal; and
the third processor activates the second light source in response to receipt of the second signal by the second receiver.

14. The throwable camera lighting system of claim 10 wherein
the first housing further comprises a first timer electrically connected to the first processor;
the second housing further comprises a second timer electrically connected to the second processor; and
the first signal is a command indicating a time for activation of the first light source.

15. The throwable camera lighting system of claim 12 wherein the first signal and the second signal are the same signal.

16. A throwable camera lighting system comprising:
a first housing suitable for being projected into an airborne trajectory comprising a camera, a first transmitter for wirelessly transmitting a first signal, and a first processor electrically connected to the camera and the first transmitter;
a second housing suitable for being projected into an airborne trajectory comprising a first light source, a first receiver for wirelessly receiving the first signal, a second transmitter for wirelessly transmitting a second signal, and a second processor electrically connected to the first receiver, the second transmitter and the first light source;
a third housing suitable for being projected into an airborne trajectory comprising a second light source, a second receiver for wirelessly receiving the second signal, and a third processor electrically connected to the second receiver and the second light source; wherein
the first processor initiates transmission of the first signal;
the second processor initiates transmission of the second signal in response to receipt of the first signal; and
the first processor triggers an image capture, the second processor activates the first light source in response to receipt of the first signal and the third processor activates the second light source in response to receipt of the second signal at a substantially similar moment in time.

17. The throwable camera lighting system of claim 16 wherein the first light source is a high-speed stroboscopic flash to eliminate motion blur in the captured image.

18. The throwable camera lighting system of claim 16 wherein the camera is a video camera and the first light source, upon activation, remains activated for a continuous period of time.

19. The throwable camera lighting system of claim 16 wherein
at least one of the first light source and the second light source is a high-speed stroboscopic flash to eliminate motion blur; and
at least one of the first light source and the second light source, upon activation, remains activated for a continuous period of time.

20. The throwable camera lighting system of claim 17 wherein
the first housing further comprises a first timer electrically connected to the first processor;
the second housing further comprises a second timer electrically connected to the second processor; and
the first signal is a command indicating an anticipated time for activation of the first light source.

* * * * *